US008539935B2

(12) United States Patent
Nakata et al.

(10) Patent No.: US 8,539,935 B2
(45) Date of Patent: Sep. 24, 2013

(54) FUEL INJECTION DEVICE, FUEL INJECTION SYSTEM, AND METHOD FOR DETERMINING MALFUNCTION OF THE SAME

(75) Inventors: Kenichiro Nakata, Kariya (JP); Koji Ishizuka, Chita-gun (JP)

(73) Assignee: Denso Corporation, Kariya (JP)

(*) Notice: Subject to any disclaimer, the term of this patent is extended or adjusted under 35 U.S.C. 154(b) by 33 days.

(21) Appl. No.: 12/187,638

(22) Filed: Aug. 7, 2008

(65) Prior Publication Data

US 2009/0056678 A1 Mar. 5, 2009

(30) Foreign Application Priority Data

Aug. 31, 2007 (JP) ................................ 2007-227117
Jun. 6, 2008 (JP) ................................ 2008-149096

(51) Int. Cl.
*F02M 51/00* (2006.01)
*G06F 19/00* (2011.01)
*G06G 7/70* (2006.01)

(52) U.S. Cl.
USPC .......................................... 123/480; 701/115

(58) Field of Classification Search
USPC ............. 123/480, 479, 673, 486, 494, 585.1; 701/103, 104, 105, 107, 115, 35.12, 114.38, 701/114.43, 114.45, 114.51; 73/35.12, 114.38, 73/114.43, 114.45, 114.51; 239/585.1, 103, 239/104, 105, 107, 115
See application file for complete search history.

(56) References Cited

U.S. PATENT DOCUMENTS

| | | | | |
|---|---|---|---|---|
| 5,634,448 | A * | 6/1997 | Shinogle et al. | 123/480 |
| 6,363,314 | B1 * | 3/2002 | Hafner et al. | 701/104 |
| 6,418,913 | B1 * | 7/2002 | Schmidt et al. | 123/480 |
| 6,526,947 | B2 * | 3/2003 | Shimada et al. | 123/495 |
| 6,729,297 | B2 * | 5/2004 | Futonagane et al. | 123/299 |
| 6,755,176 | B2 * | 6/2004 | Takeuchi et al. | 123/299 |
| 7,305,972 | B2 * | 12/2007 | Kloos et al. | 123/479 |
| 7,363,141 | B2 * | 4/2008 | Fujii | 701/104 |
| 2003/0154956 | A1 * | 8/2003 | Eckerle et al. | 123/357 |

(Continued)

FOREIGN PATENT DOCUMENTS

| | | |
|---|---|---|
| EP | 1 365 135 | 11/2003 |
| JP | 10-047137 | 2/1998 |

(Continued)

OTHER PUBLICATIONS

U.S. Appl. No. 12/186,038 of Nakata, filed Aug. 5, 2008.

(Continued)

*Primary Examiner* — Stephen K Cronin
*Assistant Examiner* — Sizo Vilakazi
(74) *Attorney, Agent, or Firm* — Nixon & Vanderhye P.C.

(57) ABSTRACT

A fuel injection device includes a fuel injection valve for injecting fuel, which is distributed from a pressure-accumulation vessel. A pressure sensor is located in a fuel passage, which extends from the pressure-accumulation vessel to a nozzle hole. The pressure sensor is located closer to the nozzle hole than the pressure-accumulation vessel. A storage unit stores individual difference information obtained by an examination. The individual difference information indicates an injection characteristic of the fuel injection valve and indicates at least one of an injection response time delay between an injection start point and a time point, at which a fluctuation is caused by the start of fuel injection in detected pressure of the pressure sensor, and a parameter for calculating the injection response time delay.

4 Claims, 10 Drawing Sheets

(56) References Cited

U.S. PATENT DOCUMENTS

| | | | | |
|---|---|---|---|---|
| 2004/0128055 | A1* | 7/2004 | Jaliwala et al. | 701/104 |
| 2006/0149456 | A1* | 7/2006 | Radue | 701/105 |
| 2007/0239345 | A1* | 10/2007 | Bizub | 701/114 |
| 2009/0056676 | A1* | 3/2009 | Nakata et al. | 123/478 |
| 2009/0056678 | A1* | 3/2009 | Nakata et al. | 123/480 |

FOREIGN PATENT DOCUMENTS

| | | | | |
|---|---|---|---|---|
| JP | 10-047144 | | | 2/1998 |
| JP | 10047137 | A | * | 2/1998 |
| JP | 2001-073857 | | | 3/2001 |
| JP | 2001073857 | A | * | 3/2001 |
| JP | 2002-276503 | | | 9/2002 |
| JP | 2006-200378 | | | 8/2006 |
| JP | 2006-219982 | | | 8/2006 |
| JP | 2006219982 | A | * | 8/2006 |
| JP | 2007-016695 | | | 1/2007 |

OTHER PUBLICATIONS

U.S. Appl. No. 11/930,668 of Ishizuka, filed Oct. 31, 2007.
U.S. Appl. No. 12/179,235 of Ishizuka filed Jul. 24, 2008.
U.S. Appl. No. 12/194,130, Kenichiro Nakata et al., filed Aug. 19, 2008.
U.S. Appl. No. 12/197,447, Kenichiro Nakata et al., filed Aug. 25, 2008.
U.S. Appl. No. 12/210,409, Koji Ishizuka et al., filed Sep. 15, 2008.
U.S. Appl. No. 12/195,609, Kenichiro Nakata et al., filed Aug. 21, 2008.
U.S. Appl. No. 12/210,440, Kenichiro Nakata et al., filed Sep. 15, 2008.
U.S. Appl. No. 12/235,917, Kenichiro Nakata et al., filed Sep. 23, 2008.
U.S. Appl. No. 12/233,800, Kenichiro Nakata et al., filed Sep. 19, 2008.
U.S. Appl. No. 12/194,917, Kenichiro Nakata et al., filed Aug. 20, 2008.
U.S. Appl. No. 12/189,376, Kenichiro Nakata et al., filed Aug. 11, 2008.
U.S. Appl. No. 12/236,882, Koji Ishizuka et al., filed Sep. 24, 2008.
U.S. Appl. No. 12/201,426, Kenichiro Nakata et al., filed Aug. 29, 2008.
U.S. Appl. No. 12/255,936, Koji Ishizuka et al., filed Oct. 22, 2008.
U.S. Appl. No. 12/256,100, Koji Ishizuka et al., filed Oct. 22, 2008.
U.S. Appl. No. 12/258,726, Koji Ishizuka et al., filed Oct. 27, 2008.
U.S. Appl. No. 12/258,750, Koji Ishizuka et al., filed Oct. 27, 2008.
Japanese Office Action dated Jun. 16, 2009, issued in corresponding Japanese Application No. 2008-149096, with English translation.
Office Action (2 pgs.) dated Mar. 14, 2011 issued in corresponding Chinese Application No. 200810214283.4 with an at least partial English-language translation thereof (2 pgs.).
Second Office Action (4 pgs.) dated Feb. 2, 2012 issued in corresponding Chinese Application No. 200810214283.4 with an at least partial English-language translation thereof (4 pgs.).
Office Action (4 pgs.) dated Aug. 1, 2012 issued in corresponding Chinese Application No. 200810214283.4 with an at least partial English-language translation thereof (4 pgs.).
Office Action (6 pgs.) dated Nov. 30, 2012 issued in corresponding Chinese Application No, 200810214283.4 with an at least partial English-language translation thereof (8 pgs.).

* cited by examiner

FUEL INJECTION DEVICE, FUEL INJECTION SYSTEM, AND METHOD FOR DETERMINING MALFUNCTION OF THE SAME

CROSS REFERENCE TO RELATED APPLICATIONS

This application is based on and incorporates herein by reference Japanese Patent Applications No. 2007-227117 filed on Aug. 31, 2007 and No. 2008-149096 filed on Jun. 6, 2008.

FIELD OF THE INVENTION

The present invention relates to a fuel injection device having a fuel injection valve for injecting fuel which is distributed from a pressure-accumulation vessel. The present invention further relates to a fuel injection system having the fuel injection device. The present invention further relates to a method for determining malfunction in the fuel injection device.

BACKGROUND OF THE INVENTION

Conventionally, a common-rail fuel infection device includes a common rail as a pressure-accumulation vessel, which is configured to accumulate fuel at high pressure. The common rail is further configured to distribute the high-pressure fuel to fuel injection valves for injecting the distributed fuel respectively to cylinders of an internal combustion engine. Such a conventional common-rail fuel injection device in JP-A-2006-200378 includes a pressure sensor as a rail pressure sensor. The pressure sensor is mounted to the common rail for detecting pressure of fuel accumulated in the common rail. The common-rail fuel injection device is configured to control various devices such as a fuel pump for supplying fuel to the common rail based on a detection result of the pressure sensor.

The fuel injection device in JP-A-2006-200376 controls an injection quantity Q by controlling an opening period Tq of the fuel injection valve. Even in fuel injection valves of the same type, each fuel injection valve has a specific relationship between the opening period and the injection quantity, and the specific relationship has an individual difference. Therefore, the specific relationship as an injection characteristic (Tq−Q characteristic) is examined for each fuel injection valve before factory shipment thereof. The injection characteristic, which is obtained through the examination, is encoded to generate a QR Code (registered trademark), which indicates individual difference information. The QR Code is adhered to the fuel injection valve.

The QR Code, which indicates the individual difference information, is read using a scanner device. Thereafter, the individual difference information is stored in an engine ECU, which controls an operating condition of an engine. After the factory shipment of the fuel injection valve, the fuel injection valve is mounted to an engine. Thus, the engine ECU of the engine manipulates the opening period Tq based on the stored individual difference information, thereby controlling the injection quantity Q of the fuel injection valve.

However, in recent years, it is required to further control various kinds of injection states, in addition to controlling the injection quantity Q in one opening of in the fuel injection valve, which is mounted to the engine. The various kinds of injection states may include an actual injection start point, a maximum injection rate reach point, and the like in each injection. That is, even when the injection quantity Q is the same, if an injection state such as an actual injection start point and a maximum injection rate reach point is changed, the combustion state of the engine is changed. As a result, output torque of the engine and the state of exhaust air are changed.

In particular, in a fuel injection device for performing a multi-stage injection in a diesel engine, if is required to control the injection state, such as actual injection start point and the maximum injection rate reach point, other than the injection quantity Q so as to control multiple fuel injections in one burning cycle.

On the contrary, in the fuel injection device according to JP-A-2006-200378, only the Tq−Q characteristic is obtained by conducting the examination, and the Tq−Q characteristic is stored as the individual difference information of the fuel injection valve. Therefore, injection states other than the injection quantity Q cannot be obtained as the individual difference. Thus, if is difficult to control the injection states other than injection quantity Q with high accuracy.

SUMMARY OF THE INVENTION

In view of the foregoing and other problems, it is an object of the present invention to produce a fuel injection device, which is capable of controlling an injection state of a fuel injection valve with high accuracy. It is another object to produce a fuel injection system having the fuel injection device. It is another object of the present invention to produce a method for determining a malfunction in a fuel injection device, the fuel injection device being capable of controlling an injection state thereof at high accuracy.

According to one aspect of the present invention, a fuel injection device configured to be supplied with fuel from a pressure-accumulation vessel, the fuel injection device comprises a fuel injection valve for injecting fuel, which is distributed from the pressure-accumulation vessel. The fuel injection device further comprises a pressure sensor located in a fuel passage, which extends from the pressure-accumulation vessel to a nozzle hole of the fuel injection valve, the pressure sensor being located closer to the nozzle hole than the pressure-accumulation vessel and configured to detect pressure of fuel. The fuel injection device further comprises a storage unit for storing individual difference information, which indicates an injection characteristic of the fuel injection valve, the injection characteristic being obtained by an examination. The individual difference information includes injection response delay information, which indicates at least one of an injection response time delay and a first parameter. The injection response time delay is a time period from an injection start point, at which fuel injection through the nozzle hole starts, to a time point, at which a fluctuation occurs in defected pressure of the pressure sensor, the fluctuation being attributed to the start of fuel injection. The first parameter is required for calculating the injection response time delay.

According to another aspect of the present invention, a method for determining a malfunction caused in a fuel injection device, the fuel injection device including a fuel injection valve, which is configured to inject fuel distributed from a pressure-accumulation vessel, and a pressure sensor, which is located in a fuel passage extending from the pressure-accumulation vessel to a nozzle hole for detecting pressure of fuel, the pressure sensor being located closer to the nozzle hole than the pressure-accumulation vessel, the method comprises measuring an injection response time delay by conducting an examination, the injection response time delay being a time period from a time point, at which fuel injection through the nozzle hole, starts, to a time point, at which a fluctuation occurs in detected pressure of the pressure sensor, the fluctuation being attributed to the start of fuel injection. The method further comprises determining that the fuel injection device malfunctions when the injection response time delay is larger than a threshold.

According to another aspect of the present invention, a method for determining a malfunction caused in a fuel injection device, the fuel injection device including a fuel injection valve, which is configured to inject fuel distributed from a pressure-accumulation vessel, and a pressure sensor, which is located in a fuel passage extending from the pressure-accumulation vessel to a nozzle hole for detecting pressure of fuel, the pressure sensor being located closer to the nozzle hole than the pressure-accumulation vessel, the method comprises first-measuring a reference instruction-detection time delay by conducting an examination for a master fuel injection valve and a master sensor. The method further comprises second-measuring an object instruction-detection time delay by conducting an examination for the fuel injection valve and pressure sensor as examined objects of the malfunction. Each of the reference instruction-detection time delay and the object instruction-detection time delay is a time period from a time point, at which an injection start instruction signal is outputted, to a time point, at which a fluctuation occurs in detected pressure, the fluctuation being attributed to start of fuel injection. The master fuel injection valve and the master sensor are respectively different from the fuel injection valve and pressure sensor. The method further comprises determining that at least one of the examined objects malfunctions when an error of the object instruction-detection time delay with respect to the reference instruction-detection time delay is larger than a threshold.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

A fuel injection device according to the present embodiment is mounted to, for example, a common-rail fuel injection system for an internal combustion engine for an automobile. For example, the present fuel injection device is used for directly injecting high-pressure fuel to a combustion chamber in a cylinder of a diesel engine. The high-pressure fuel is, for example, light oil, which is at injection pressure more than 100 MPa.

Figure 1:
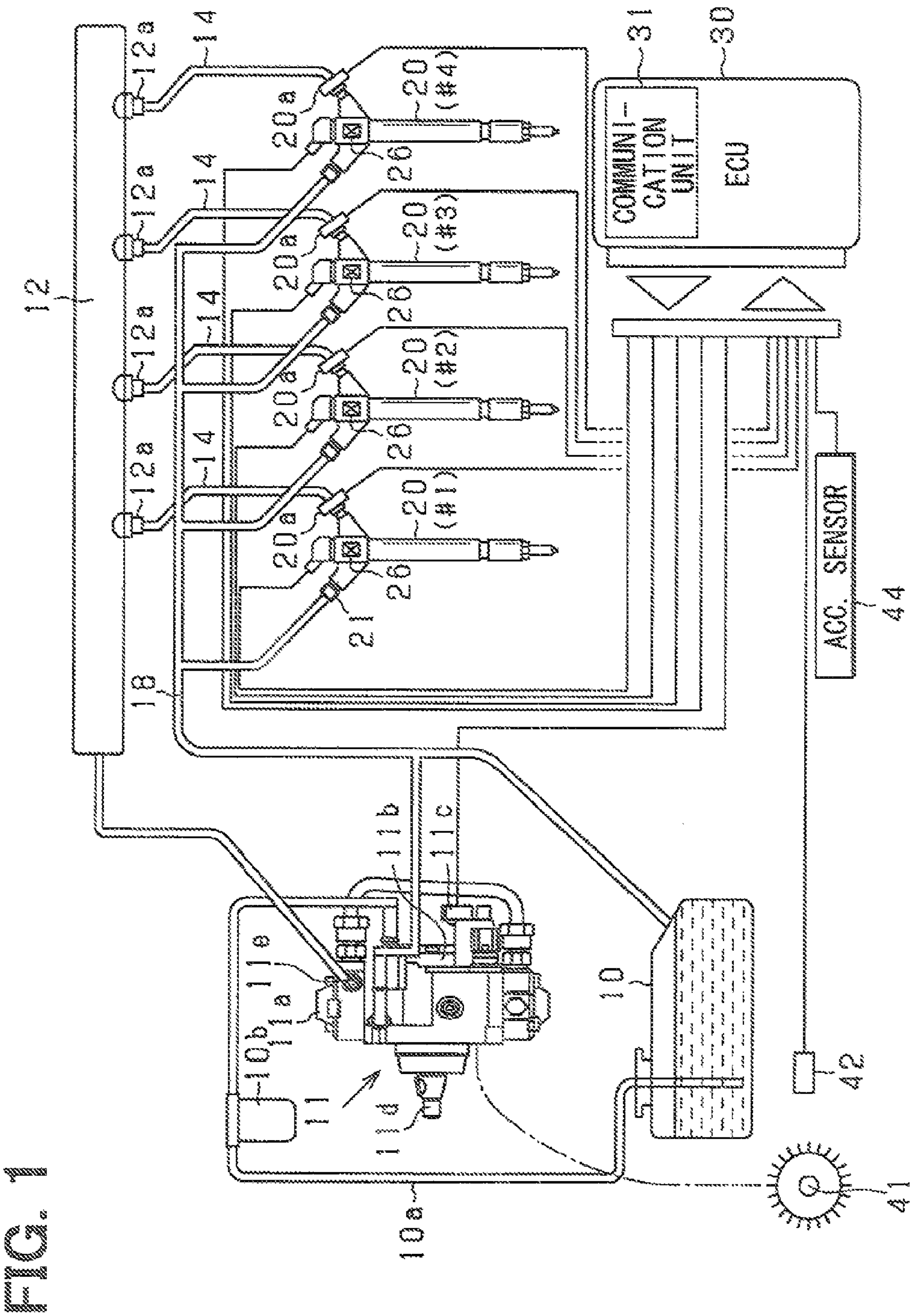
FIG. 1 is a schematic diagram showing an outline of a fuel injection device and an engine control system according to an embodiment.

First, the common-rail fuel injection system as an in-vehicle engine system according to the present embodiment is described with reference to FIG. 1. In the present embodiment, the engine is, for example, a multi-cylinder engine such as an inline four-cylinder engine. Specifically, the engine may be a four-stroke reciprocal diesel engine, in the present engine, an electromagnetic pickup as a cylinder-detection sensor is provided to a camshaft of an intake valve and an exhaust valve so as to successively determine an object cylinder at that time. Each of four cylinders #1 to #4 repeats four-stroke combustion cycles, each including an intake stroke, a compression stroke, a combustion stroke, and an exhaust stroke, at 720 degree CA (crank angle). In detail, the #1, #3, #4, #2 cylinders perform the four-stroke combustion cycle in this order at 180-degree-CA shift relative to each other. In FIG. 1, injectors 20 as fuel injection valves are respectively assigned to the cylinders #1, #2, #3, #4 from the side of a fuel tank 10.

As shown in FIG. 1, the present fuel injection system includes an electronic control unit (ECU) 30, which is configured to input detection signals, which are outputted from various sensors, and control components of a fuel supply system in accordance with the detection signals. The ECU 30 controls an electric current, which is supplied to a suction control valve 11*c*, thereby controlling an amount of fuel discharged from a fuel pump 11. The ECU 30 performs a feedback control such as PID control to regulate fuel pressure in a common rail 12 as a pressure-accumulation vessel at target fuel pressure. The pressure in the common rail 12 is detected using a pressure sensor 20*a*. The ECU 30 controls an amount of fuel injected into a specific cylinder of the engine based on the fuel pressure, thereby controlling rotation speed and torque of an output shaft of the engine.

The fuel tank 10, the fuel pump 11, the common rail 12, and the injectors 20 are arranged in this order from the upstream in the fuel supply system. The fuel tank 10 is connected with the fuel pump 11 through a fuel filter 10*b* and a pipe 10*a*.

The fuel tank 10 as a vessel is for storing fuel such as light oil for the engine. The fuel pump 11 includes a high-pressure pump 11*a* and a low-pressure pump 11*b*. The low-pressure pump 11*b* is configured to pump fuel from the fuel tank 10, and the high-pressure pump 11*a* is configured to further pressurize the fuel pumped from the low-pressure pump 11*b*. A suction control valve (SCV) 11*c* is provided in an inlet of the fuel pump 11 to control an amount of fuel fed to the high-pressure pump 11*a*. In the present structure, the SCV 11*c* controls an amount of fuel discharged from the fuel pump 11.

The suction control valve 11*c* is, for example, a normally-on regulating valve, which opens when being de-energized. In the present structure, an amount of fuel discharged from the fuel pump 11 can be regulated by controlling a drive current supplied to the suction control valve 11*c* so as to manipulate a valve-opening area of the suction control valve 11*c*.

The low-pressure pump 11*b* of the fuel pump 11 is, for example a trochoid feed pump. The high-pressure pump 11*a* is, for example, a plunger pump, which is configured to feed fuel from compression chambers by axially moving plungers successively at predetermined intervals by using an eccentric cam (not shown). The plungers may include three plungers, for example. The pumps are driven by using a driving shaft 11*d*. The driving shaft 11*d* is interlocked with a crankshaft 41, which is an output shaft of the engine. The driving shaft 11*d* is configured to rotate at a ratio such as one-to-one or one-to-two with respect to one rotation of the crankshaft 41, for example. In the present structure, the low-pressure pump 11*b* and the high-pressure pump 11*a* are driven by the output power of the engine.

The fuel pump 11 pumps fuel from the fuel tank 10 through the fuel filter 10*b* and press-feeds the pumped fuel to the common rail 12. The common rail 12 stores the fuel, which is fed from the fuel pump 11, at high pressure. The common rail 12 distributes the accumulated fuel to the injector 20 of each of the cylinders #1 to #4 through a high-pressure pipe 14, which is provided to each cylinder. Each of the injectors 20(#1) to 20(#4) has an exhaust port 21, which is connected with a pipe 18 for returning excessive fuel to the fuel tank 10. An orifice 12*a* as a pulsation reducing unit is provided to a connection between the common rail 12 and the high-pressure pipe 14 for attenuating pulsation in pressure of fuel, which flows from the common rail 12 into the high-pressure pipe 14.

Figure 2:
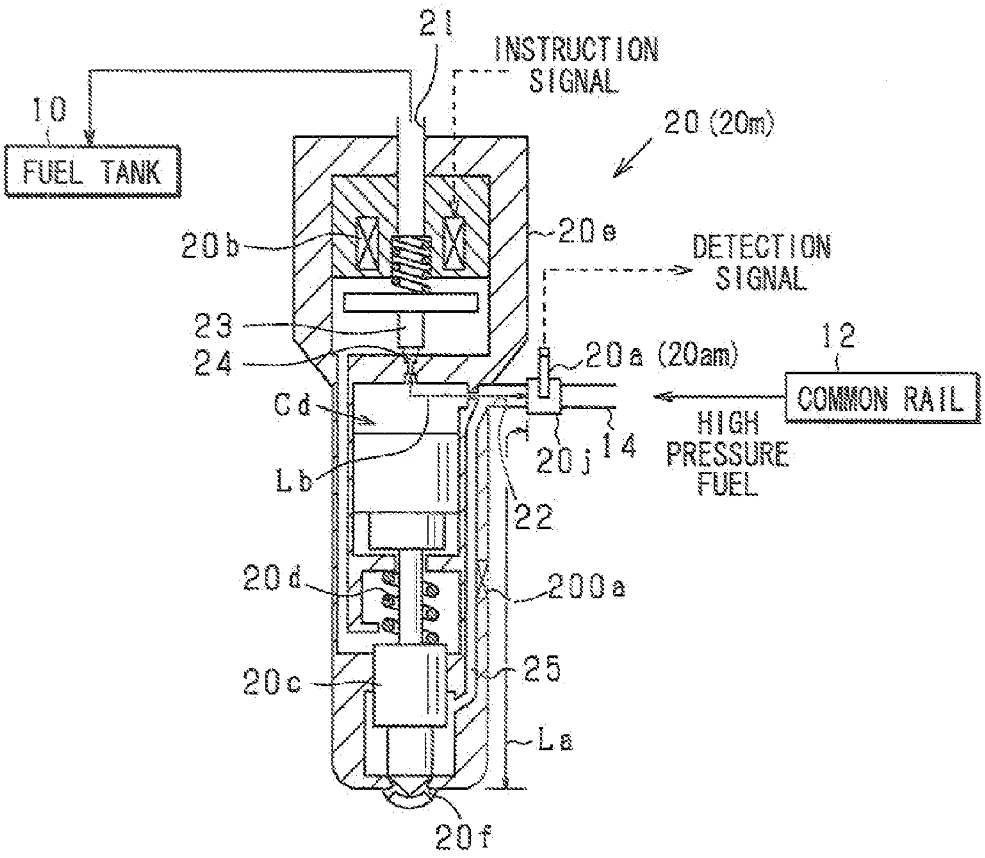
FIG. 2 is a schematic sectional view showing an internal structure of a fuel injection valve employed in the engine control system.

FIG. 2 shows a detailed structure of the injector 20. The four injectors 20(#1) to 20(#4) substantially has the same structure, which is, for example, the structure shown in FIG. 2. Each injector 20 is a fuel injection valve, which is hydraulically actuated using fuel, which is drawn from the fuel tank 10 and to be burned in the engine. In the injector 20, driving power for fuel injection is transmitted via a hydraulic pressure chamber Cd as a control chamber. As shown in the FIG. 2, the injector 20 is configured as the normally-close fuel injection valve, which is in a closed state when being de-energized.

High-pressure fuel is supplied from the common rail 12, and the High-pressure fuel flows into a fuel inlet hole 22, which is provided in a housing 20*e* of the injector 20. The supplied high-pressure fuel partially flows into the hydraulic pressure chamber Cd, and remaining high-pressure fuel flows to nozzle holes 20*f*. The hydraulic pressure chamber Cd has a leak hole 24, which is opened and closed by a control valve 23. When the leak hole 24 is opened by lifting the control valve 23, fuel is returned from the hydraulic pressure chamber Cd to the fuel tank 10 through the leak hole 24 and the exhaust port 21.

In the fuel injection of the injector 20, the control valve 23 is operated according to the energization and de-energization of a solenoid 20*b*, which is a two-way solenoid valve, whereby the control valve 23 controls leakage of fuel from the hydraulic pressure chamber Cd. Thus, the control valve 23 controls pressure in the hydraulic pressure chamber Cd. Here, the pressure in the hydraulic pressure chamber Cd is equivalent to backpressure applied to a needle valve 20*c*. Thus, the needle valve 20*c* reciprocates upward and downward inside the housing 20*e* according to the change in pressure in the hydraulic pressure chamber Cd, while being applied with biasing force of a coil spring 20*d*. In the present operation, a fuel passage 25, which extends to the nozzle holes 20*f*, is opened and closed midway therethrough. Specifically, the fuel passage 25 has a tapered seat surface, and the needle valve 20*c* is seated to and lifted from the tapered seat surface in accordance with the reciprocation of the needle valve 20*c*, whereby the needle valve 20*c* communicates and blockades the fuel passage 25. The number of the nozzle holes 20*f* may be arbitrary determined.

The needle valve 20*c* is, for example, on-off controlled. Specifically, the needle valve 20*c* has the two-way solenoid valve as the actuator, which is applied with a pulse signal as an energization signal. The pulse signal as an ON-OFF signal is transmitted from the ECU 30 to energize and de-energize the solenoid valve. The needle valve 20*c* is lifted by turning on the pulse signal, thereby opening the nozzle holes 20*f*. The needle valve 20*c* is seated by turning of the pulse signal, thereby blockading the nozzle holes 20*f*.

The pressure in the hydraulic pressure chamber Cd is increased by supplying fuel from the common rail 12. On the other hand, the pressure in the hydraulic pressure chamber Cd is decreased by energizing the solenoid 20*b* to manipulate the control valve 23 so as to open the leak hole 24. In the present structure, fuel is returned from the hydraulic pressure chamber Cd to the fuel tank 10 through the pipe 18 (FIG. 1), which connects the injector 20 with the fuel tank 10. That is, the fuel pressure in the hydraulic pressure chamber Cd is controlled by manipulating the control valve 23, so that the needle valve 20*c* is operated for opening and closing the nozzle holes 20*f*.

In the present structure, the injector 20 includes the needle valve 20*c*, which is configured to open and close the injector 20 by opening and closing the fuel passage 25, which extends to the nozzle holes 20*f*, in conjunction with the predetermined axial reciprocation inside the housing 20*e* as the valve body. When the solenoid is de-energized, the needle valve 20*c* is displaced to a close side by being applied with the biasing force of the spring 20*d*, which is regularly exerted toward the close side. When the solenoid is energized, the needle valve 20*c* is displaced to an open side by being applied with the driving force against the biasing force of the spring 20*d*. The lift of the needle valve 20*c* when being energized is substantially symmetric with the lift of the needle valve 20*c* when being de-energized.

Figure 4:
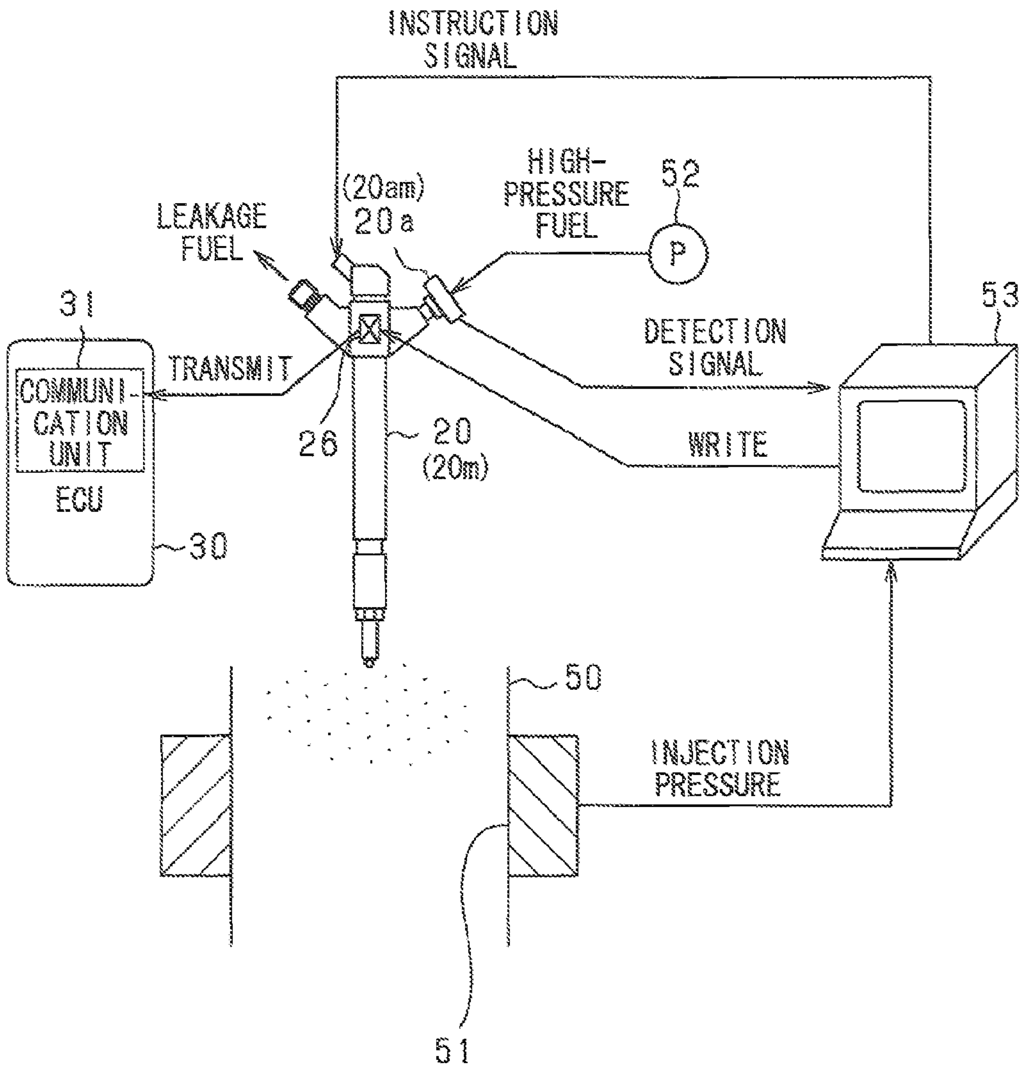
FIG. 4 is a schematic diagram showing a system for examination of an injection characteristic according to the first embodiment.

The injector 20 is provided with a pressure sensor 20*a* (FIG. 1) for detecting fuel pressure. Specifically the inlet hole 22 of the housing 20*e* is connected with the high-pressure pipe 14 via a jig 20*j*. The pressure sensor 20*a* is attached to the jig 20*j*. Here, in a stage where the injector 20 is shipped from a factory, the injector 20 is attached with the Jig 20*j*, the pressure sensor 20*a*, and an IC memory 26 (FIGS. 1, 4).

Thus, the fuel pressure as inlet pressure in the fuel inlet hole 22 can be arbitrary detected by the pressure sensor 20*a*, which is mounted to the fuel inlet hole 22 of the injector 20. Specifically, a fluctuation pattern of the fuel pressure attributed to fuel injection of the injector 20, a fuel pressure level (stable pressure), fuel injection pressure, and the like can be detected in accordance with the output of the pressure sensor 20*a*.

The pressure sensor 20*a* is provided to each of the injectors 20(#1) to 20(#4). In the present structure, the fluctuation pattern of the fuel pressure attributed to specific fuel injection of the injector 20 can be accurately detected based on the output of the pressure sensor 20*a*.

In addition, various kinds of sensors for a vehicle control other than the above-mentioned sensors are provided in a vehicle such as a four-wheel automobile or a track (not shown). For example, a crank angle sensor 42 such as an electromagnetic pick up is provided to the outer periphery of the crankshaft 41, which is an output shaft of the engine. The crank angle sensor 42 is configured to detect the rotation angle and the rotation speed of the crankshaft 41, which corresponds to the engine rotation speed. The crank angle sensor 42 is configured to output a crank angle signal at predetermined intervals such 30 degree-CA. An accelerator sensor 44 is provided to detect a manipulation, which corresponds to depression of an accelerator by a driver. The accelerator sensor 44 is configured to output an electric signal according to a state, which corresponds to the position of the accelerator.

The ECU 30 predominantly performs an engine control as a fuel injection device in the present system. The ECU 30 as an engine control ECU includes a generally-known microcomputer (not shown). The ECU 30 determines an operating state of the engine and an occupant's demand on the basis of the detection signals of the various sensors, thereby operating various actuators such as the suction control valve 11*c* and the injector 20 in response to the operating state and the occupant's demand. Thus, the ECU 30 performs various controls relating to the engine in optimal modes adaptively to the various conditions.

The microcomputer of the ECU 30 includes a CPU as a main processing unit, which performs various kinds of operations, a RAM as a main memory, which stores temporarily data, an operation result, and the like, a ROM as a program memory, an EEPROM as a data storage, a backup RAM, and the like. The backup RAM is a memory, which is regularly supplied with electric power from a backup power supply such as an in-vehicle battery even when the main power supply of the ECU 30 is terminated. Various programs and control data maps relating to the fuel injection are stored in advance in the ROM and various control data including the design data of the engine are stored in the data storage memory such as the EEPROM.

In the present embodiment, the ECU 30 calculates demand torque, which is required to the crankshaft 41 as the output shaft, and fuel injection quantity for satisfying the demand torque, based on various kinds of sensor outputs as the detection signals, which are arbitrary inputted. In the present structure, the ECU 30 variably sets the fuel injection quantity of the injector 20, thereby controlling engine torque, which is generated through fuel combustion in the combustion chamber of each cylinder. Thus, the ECU 30 controls axial torque as output torque, which is actually outputted to the crankshaft 41, at the demand torque.

That is, the ECU 30 calculates, for example, the fuel injection quantity according to the engine operation state and manipulation of the accelerator by the driver, and the like at the time. The ECU 30 outputs the injection control signal (drive quantity) to the injector 20 so as to direct to inject fuel correspondingly to the fuel injection quantity at a predetermined injection timing. In the present operation, the output torque of the engine is controlled at a target value based on the drive quantity, which is, for example, an opening period of the injector 20.

As generally known, in a diesel engine, an intake throttle valve (throttle valve), which is provided in an intake passage of the engine, is held at a substantially full open state in a steady operation so as to further draw fresh air and to reduce pumping loss. Therefore, the fuel injection quantify is mainly manipulated for controlling a combustion state at the time of the steady operation. In particular, a combustion control related to a torque adjustment is mainly performed at the time of the steady operation.

Figure 3:
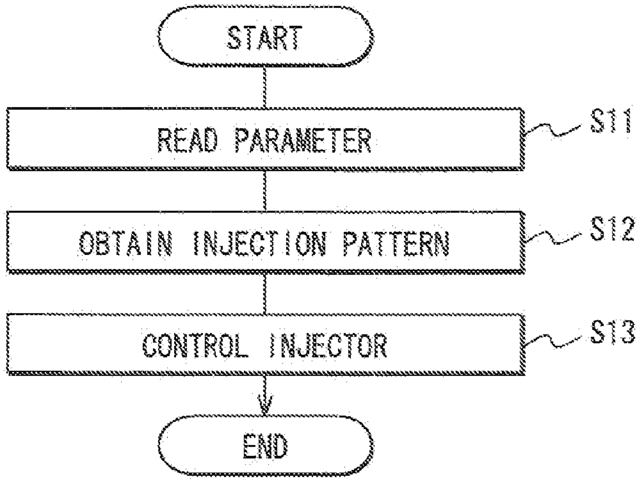
FIG. 3 is a flow chart showing an injection control according to the first embodiment.

As follows, the fuel injection control according to the present embodiment is described with reference to FIG. 3. In this regard, the values of various parameters used in the processing shown in FIG. 3 are sequentially stored in the storage device, and are sequentially updated as needed. The storage device may be the RAM and the EEPROM mounted in the ECU 30, or the backup RAM. Basically, the series of processings in FIG. 3 is performed once per one burning cycle of for each cylinder of the engine. The processings in FIG. 3 is performed by executing the program stored in the ROM of the ECU 30. That is, by executing the present program, fuel supply to all the cylinders excluding an inactive cylinder is performed in a one burning cycle.

In the series of the present processing shown in FIG. 3, at step S11, predetermined parameters are read. The predetermined parameters may include the engine speed, the fuel pressure, an accelerator manipulation of the driver, and the like at that time. The engine speed may be obtained based on an actual measurement of the crank angle sensor 42. The fuel pressure may be obtained based on an actual measurement of the pressure sensor 20*a*. The accelerator manipulation may be obtained from an actual measurement of the accelerator sensor 44.

At subsequent step S12, an injection pattern is set up based on the various parameters, which are read at step S11. The injection patterns are variably determined according to the demand torque of fine crankshaft 41, which is equivalent to the engine load at that time. For example, in a single-stage injection, the injection quantity (injection period) of the single-stage injection is variably determined as the injection pattern. Alternatively, in a multi-stage injection, the total injection quantity (the total injection period) of injections, which contribute to the engine torque, is variably determined as the injection pattern. Thus, a command value as an instruction signal for the injector 20 is set up based on the injection pattern. In the present structure, a pilot injection, a pre-injection, an after-injection, a post-injection, and the like are suitably performed with main injection according to the condition of the vehicle and the like.

The present injection pattern is obtained based on a predetermined data map such as a data map for the injection control and a correction coefficient stored in the ROM, for example. The predetermined data map may be substituted to an equation. Specifically for example, an optimal injection pattern (conformed value) may be beforehand obtained in an assumed range of the predetermined parameter (step S11) by conducting an experiment. The obtained optimal injection pattern may be stored in the data map for the injection control. The present injection pattern is defined by parameters, such as an injection stage, the injection timing of each injection, and the injection period, for example. The injection stage is a number of injections in one burning cycle. The injection period is equivalent to the injection quantity. In this way, the injection control map indicates the relationship between the parameters and the optimal injection pattern.

The injection pattern is obtained from the injection control map and is corrected using a correction coefficient. For example, the target value is calculated by diving the value on the injection control map by the correction coefficient. Thus, the injection pattern at the time and an instruction signal, which corresponds to the injection pattern and is to be outputted to the injector 20, is obtained. The correction coefficient is stored in, for example, the EEPROM of the ECU 30 and separately updated. The correction coefficient (strictly, predetermined coefficient multiple coefficients) is successively updated by a separate processing in an operation of the engine.

In the setting of the injection pattern at step S12, data maps may be respectively created separately for the injection patterns, each including identical elements such as the injection stage. Alternatively, a data map may be created for the injection pattern, which includes some of or all the elements.

The injection pattern, which is set in this way, and the command value as the instruction signal, which corresponds to the injection pattern, are used at subsequent step S13. Specifically, at step S13, the injector 20 is controlled based on the command value as the instruction signal. In particular, the injector 20 is controlled according to the instruction signal outputted to the injector 20. The series of processings in FIG. 3 is terminated after performing the control of the present injector 20.

Next, a creation procedure of the injection control map, which is used at step S12, is described.

The present injection control map is created based on an examination result, which is conducted before shipment of the injector 20 from the factory. First, the examination as an injection characteristic examination is performed for each of the injectors 20(#1) to 20(#4). Thereafter, individual difference information, which is obtained by the examination, is stored in the IC memory 26 as a storage unit (memory unit). The individual difference information indicates the injection characteristic of each injector 20. Then, the individual difference information is transmitted from each IC memory 28 to the ECU 30 through a communication unit 31 (FIGS. 1, 4), which is provided to the ECU 30. The transmission may be a non-contact wireless transmission or a wired transmission.

The injection characteristic examination is conducted in a mode shown in FIG. 4. First, the tip end of the injector 20 is put in a vessel 50. Then, high-pressure fuel is supplied to the fuel inlet hole 22 of the injector 20, whereby fuel is injected from the nozzle holes 20*f* into the vessel 50. At the present examination, the high-pressure fuel may be supplied using the fuel pump 11 shown in an FIG. 1. Alternatively as shown in FIG. 4, the high-pressure fuel may be supplied using a fuel pump 52, which is exclusively provided for the examination. The high-pressure pipe 14 and the common rail 12, which are shown in FIG. 1, need not be connected to the pressure sensor 20*a*, which is mounted to the injector 20. The pressure sensor 20*a* may be directly supplied with high-pressure fuel from the fuel, pump 11 or the fuel pump 52, which is provided for the examination.

The inner periphery of the vessel 50 is provided with a strain gauge 51. The strain gauge 51 detects pressure change, which is caused by a test injection, and outputs its defection result to a measuring instrument 53. The measuring instrument 53 includes a control unit, which is configured with a microcomputer, and the like. The control portion of the measuring instrument 53 calculates the injection rate of fuel injected from injector 20 based on the detection result of the strain gauge 51, the detection result indicating the injection pressure. As shown in FIG. 4, the measuring instrument 53 outputs the instruction signal, and the solenoid 20*b* of the injector 20 inputs the instruction signal. The measuring instrument 53 inputs the detection result of the pressure sensor 20*a* as the detected pressure.

Instead of calculating the change in injection rate based on the injection pressure, which is detected by using the strain gauge 51, the change in injection rate may be estimated from contents of the injection instruction, in this case, the strain gauge 51 can be omitted.

Figure 5:
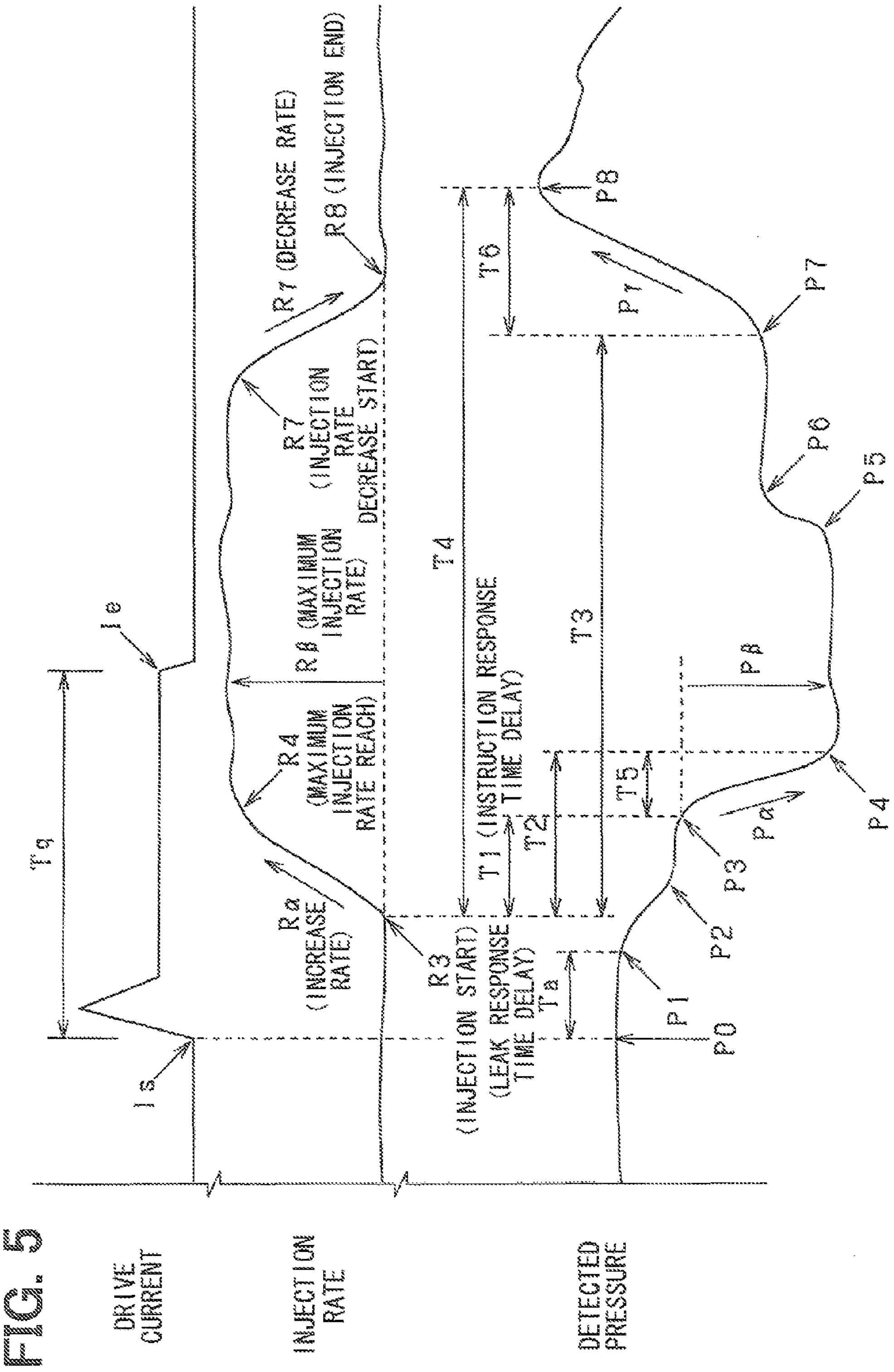
FIG. 5 is a timing chart showing the injection characteristic according to the first embodiment.

FIG. 5 shows a time chart showing changes in drive current, changes in injection rate, and changes in detected pressure through the examination. The top chart from the upper side in FIG. 5 shows the driving current as the instruction signal transmitted to the solenoid 20*b*. The second chart in FIG. 5 shows the injection rate. The bottom chart in FIG. 5 shows the detected pressure of the pressure sensor 20*a*. The present examination result is obtained by once opening and closing operation of the nozzle holes 20*f*.

In the present embodiment, such an examination is performed in each of multiple examination conditions where the pressure P0 of fuel supplied to the fuel inlet hole 22 at the time point before the P1, is changed. The examinations are performed in the multiple examination conditions, because variation in injection characteristic is not determined uniquely in dependence upon the individual difference of injector 20. Specifically, the variation in injection characteristic also changes in dependence upon fueling pressure in the common rail 12. Therefore, in the present embodiment, by using the actual measurement result in the multiple examination conditions, in which the fueling pressure is variously modified, the variation in injection characteristic caused in dependence upon the individual difference is compensated, in addition to consideration of influence caused by the fueling pressure.

As follows, change in injection rate is described with reference to the second chart in FIG. 5B. First, energization of the solenoid 20*b* is started at the time point (energization start time point) is, thereafter fuel injection from the nozzle holes 20*f* is started at the transition point R3. Thus, the injection rate starts increasing at the transition point R3. That is, actual fuel injection is started. Then, the injection rate reaches at the maximum injection rate at the transition point R4, where the injection rate stops increasing. The needle valve 20*c* starts being lifted at the time of R3 and reaches the maximum lift at the transition point R4, and hence the injection rate stops increasing at the transition point R4.

In the present specification, the transition point is defined as follows. A second-order derivative of the injection rate or a second-order derivative of the detected result of the pressure sensor 20*a* is first calculated. The extremum at the point where the change is the maximum in a waveform, which indicates the second-order derivative, is the transition point of the waveform of the injection rate or the detected pressure. That is, the inflection point of the waveform of the second-order derivative is the transition point.

Subsequently, energization of the solenoid 20*b* is terminated at the time point Ie, thereafter the injection rate starts decreasing at the transition point R7. Then, the injection rate becomes zero at the transition point R8, where the actual fuel injection is terminated. The needle valve 20*c* starts being seated at the time of R7, and the needle valve 20*c* is completely seated at the transition point R8. Hence, the nozzle holes 20*f* are closed and the actual fuel injection is terminated at the transition point R8.

Next, change in detected pressure of the pressure sensor 20*a* is described with reference to the bottom chart in FIG. 5. The pressure P0, which is before the transition point P1, is the fueling pressure defined as an examination condition. The solenoid 20*b* is first supplied with the driving current. Thereafter, the detected pressure decrease at the transition point P1 before the injection rate starts increasing at the time point R3. It is caused because the control valve 23 opens the leak hole 24 at the time point P1, whereby the hydraulic pressure chamber Cd is decompressed. Then, when the hydraulic pressure chamber Cd is sufficiently decompressed, the detected pressure, which is decreasing from the P1, once stops decreasing at the transition point P2.

Subsequently, the detected pressure starts decreasing at the transition point P3, since the injection rate starts increasing at the time point R3. Subsequently, the decrease in the detected pressure stops at the transition point P4, since the injection rate reaches the maximum injection rate at the time point R4. Here, the decrease in detected pressure between the transition points P3 and P4 is larger than the decrease in detected pressure between the transition points P1 and P2.

Subsequently, the detected pressure increases at the transition point P5. It is caused because the control valve 23 closes the leak hole 24 at the time of P5, whereby the hydraulic pressure chamber Cd is pressurized. Then, when the hydraulic pressure chamber Cd is sufficiently pressurized, the detected pressure, which is increasing from the transition point P5, once stops increasing at the transition point P8.

Figure 8:
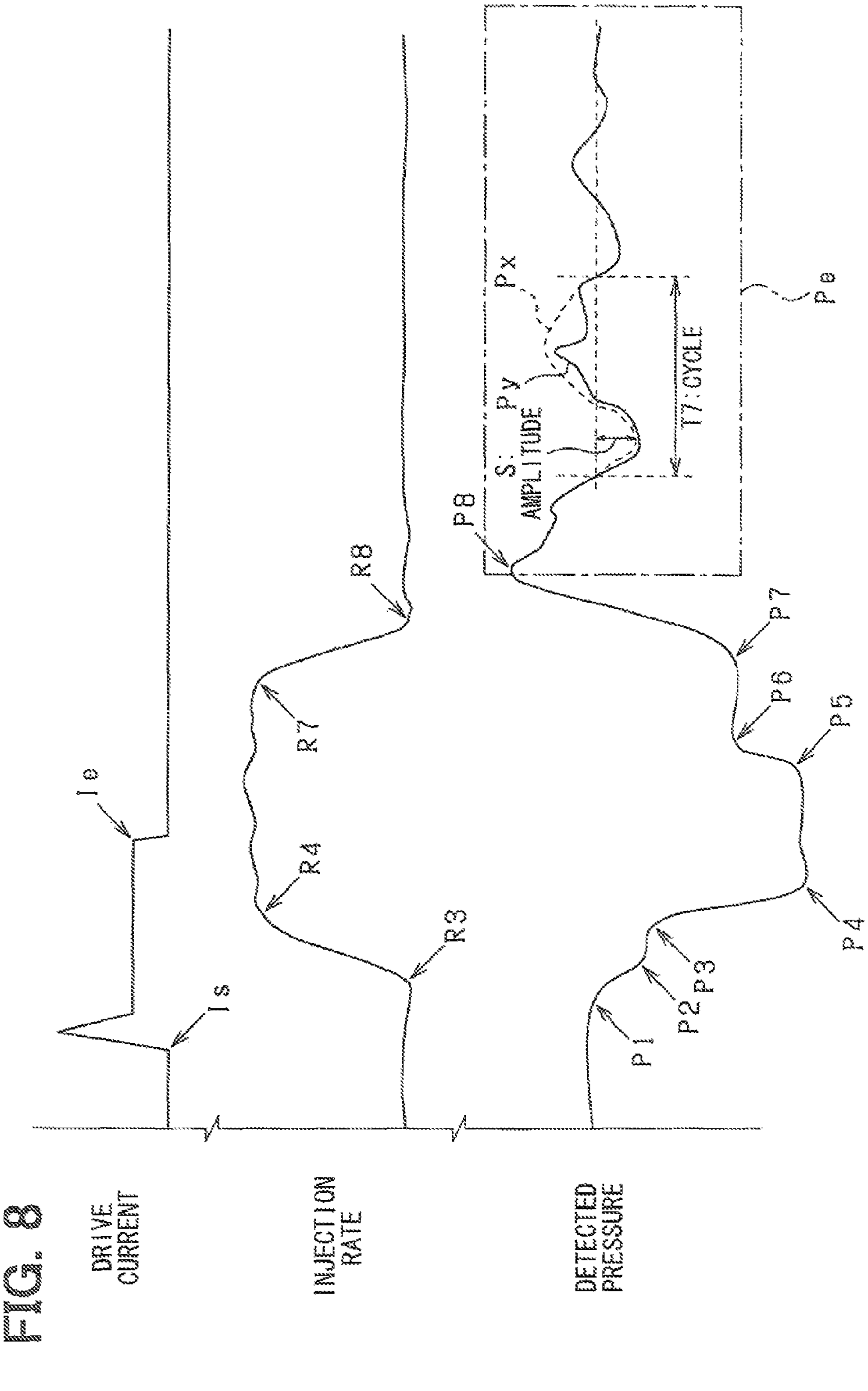
FIG. 8 is a timing chart showing the injection characteristic according to the first embodiment.

Subsequently, the detected pressure starts increasing at the transition point P7, since the injection rate starts decreasing at the time point R7. Subsequently, the increase in detected pressure stops at the transition point P8, since the injection rate reaches zero at the time point R8, and actual fuel injection stops at the time point R8. Here, the increase in detected pressure between the transition points P7 end P8 is larger than the increase in detected pressure between the transition points P5 and P8. As shown in FIG. 8, the detected pressure subsequent to P8 decreases while repeating decreasing and increasing at a constant cycle T7 (FIG. 8).

In creating of the injection control map, individual difference information A1 to A7, B1, B2, and C1 to C3 (mentioned later) are first calculated based on the injection characteristic obtained from the examination result shown in FIG. 5. The obtained injection characteristic includes the change in defected pressure and the change in injection rate shown in FIG. 5. The calculated various individual difference information is stored in the IC memory 28. Then, the individual difference information stored in the IC memory 26 is transmitted to the ECU 30. The ECU 30 creates or modifies the injection control map based on the transmitted individual difference information.

<Individual Difference Information A1 to A7>

Figure 6:
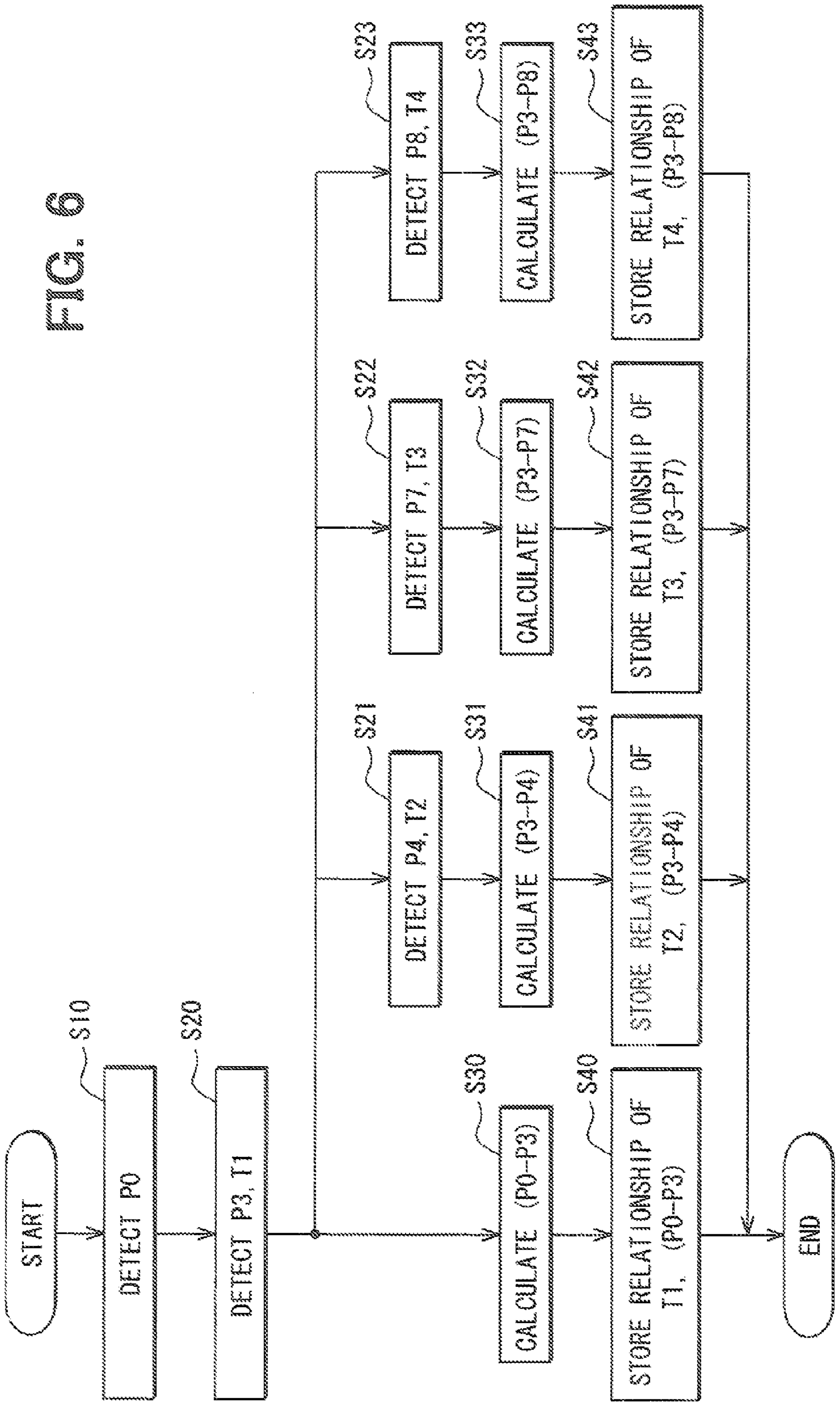
FIG. 6 is a flowchart showing a procedure of a calculation process for individual difference information and a writing process to an IC memory.
Figure 7:
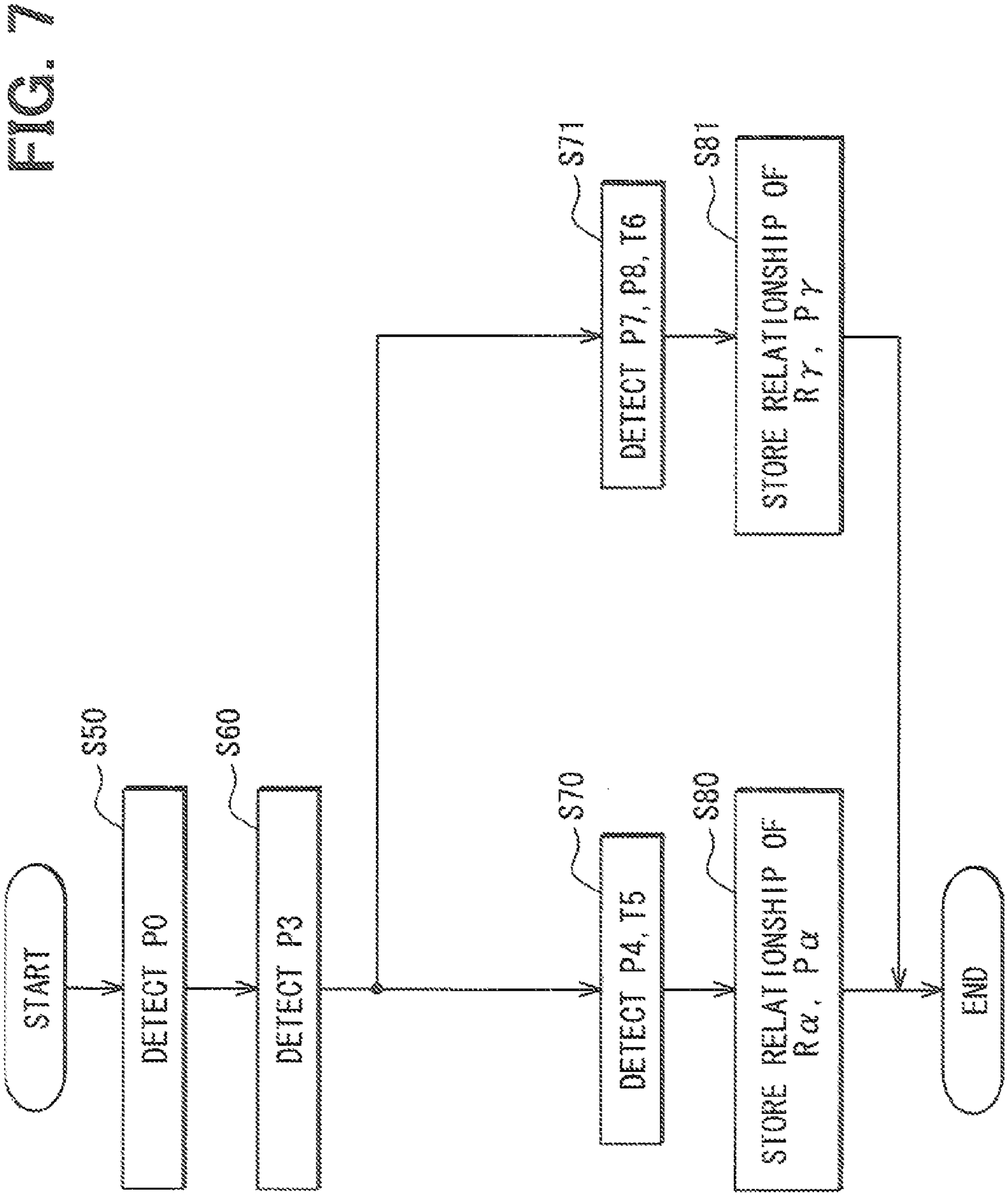
FIG. 7 is a flowchart showing a procedure of a calculation process for individual difference information and a writing process to an IC memory.

Next, the individual difference information A1 to A7 is described in detail. In addition, the procedure of the generation process of the individual difference information A1 to A7 and the writing process to the IC memory 26 are described with reference to FIGS. 6, 7. In the present embodiment, the calculation process and the writing process respectively shown in FIGS. 6, 7 are performed by a measurement operator using the measuring instrument 53. Alternatively, the measuring instrument 53 may automatically perform the series of processes, which are equivalent to those shown in FIGS. 6, 7.

The pressure sensor 20*a* is mounted to the injector 20. In the present structure, the pressure sensor 20*a* is located at the downstream of the common rail 12 with respect to the fuel flow in the fuel passage, which extends from the common rail 12 to the nozzle holes 20*f*. That is, the pressure sensor 20*a* is located on the side of the nozzle holes 20*f* in the fuel passage. Therefore, fluctuation, which is caused by the change in injection, rate, can be obtained as information from the waveform of the defected pressure of the pressure sensor 20*a*. Here, the fluctuation, which is caused by the change in injection rate, may not be obtained in a structure where the pressure sensor 20*a* is located in the common rail 12. In addition, such a fluctuation in detected pressure has a high correlation with the change in injection rate, as indicated by the examination result in FIG. 5. Therefore, the change in actual injection rate can be estimated from the fluctuation in the waveform of the detected pressure, based on the present correlation.

The individual difference information A1 to A7 is defined by noting acquisition of the correlation between such a change in injection rate and fluctuation in defected pressure. Specifically, the individual difference information A1 to A7 represents a relationship between the change in injection rate (injection state) in the period between the transition points R3, R8 when the injector 20 injects fuel and the fluctuation in detected pressure of the pressure sensor 20*a* in the range between the transition points P1, P8, the fluctuation being attributed to the fuel injection.

In the process in FIG. 6, the detected pressure P0 at the energization start time point Is is first obtained at S10. At the energization start time point Is, energization of the solenoid 20*b* is started. Next, the detected pressure at the transition point P3, which is attributed to the actual injection start R3, is obtained at S20. In addition, the lapsed time T1 (first period) from the time point R3 (first reference point), in which the actual injection start is started, to the time point of the transition point P3 is measured at S20. Next, at S30, pressure difference P0−P3 is calculated as decrease in detected pressure caused by leakage in the time period from the energization start time point Is to the actual injection starts. Next, the relationship between the lapsed time T1 and the pressure difference P0−P3 is defined as individual difference information A1, and the individual difference information A1 is stored in the IC memory 26 at S40.

The individual difference information A2 to A4 is also stored in the IC memory 28 by a similar procedure at S21 to S41, S22 to S42, and S23 to S43. Specifically, pressure at the transition points P4, P7, P8, which are respectively attributed to the R4 (maximum injection rate reach), the R7 (injection rate decrease start), and the R8 (actual injection end), is obtained at S21 to S23. In addition, the lapsed time T2 (second period), T3 (third period), and T4 (fourth period) are measured at S21 to S23. The lapsed time T2, T3, T4 are respectively time periods from the actual injection start R3 (second, third, fourth reference point) to the transition points P4, P7, P8.

Next, at S31, pressure difference P3−P4 is calculated as decrease in detected pressure caused by leakage and fuel injection in the time period from the energization start time point Is to the transition point R4 where injection rate reaches the maximum injection rate. Next, at S32, pressure difference P3−P7 is calculated as decrease in detected pressure caused in the time period from the energization start time point Is to the transition point R7 where the injection rate starts decreasing. Next, at S33, pressure difference P3−P8 is calculated as change in detected pressure caused in the time period from the energization start time point Is to the transition point R8 where the actual injection ends. Each of the pressure difference P0−P3, P3−P4, and P3−P7 is represented by a positive value indicating pressure decrease (pressure drop). The pressure difference P3−P8 is represented by a negative value indicating pressure increase.

The relationship between the lapsed time T2 and the pressure difference P3−P4 is defined as the individual difference information A2 at S41. The relationship between the lapsed time T3 and the pressure difference P3−P7 is defined as the individual difference information A3 at S42. The relationship between the lapsed time T4 and the pressure difference P3−P8 is defined as the individual difference information A4 at S43. The individual difference information A2 to A4 is stored in the IC memory 28 at S41, S42, S43. Thus, the process before the factory shipment of the injector 20 in FIG. 6 ends.

In the process in FIG. 7, the detected pressure P0 at the time point Is is first obtained at S50. At the energization start time point Is, energization of the solenoid 20*b* is started. Next, the detected pressure at the transition point P3, which is attributed to the actual injection start R3, is obtained at S60. Next, the defected pressure at the transition point P4, which is attributed to the maximum injection rate reach R4, is obtained at S70. In addition, the lapsed time T5 (injection rate increase period) from the transition point P3, which is attributed to the actual injection start R3, to the transition point P4 is measured at S70. Next, pressure decrease rate Pα (Pα=(P3−P4)/T5) is calculated based on the detected pressure at the transition points P3, P4 and the period T5. Next, the relationship between the increase rate Rα in injection rate and the pressure decrease rate Pα is defined as the individual difference information A5, and the individual difference information A5 is stored in the IC memory 26 at S80.

The individual difference information A6 is also stored in the IC memory 26 by a similar procedure at S71, S81. Specifically, the detected pressure at the transition points P7, P8, which are attributed to the injection rate decrease start R7 and the actual injection end R8, is obtained at S71. In addition, the lapsed time T6 (injection rate decrease period) from the transition point P7 (sixth reference point), which is attributed to the injection rate decrease start R7, to the transition point P8 is measured at S71. Next, pressure increase rate Pγ (Pγ=(P7−P8)/T6) is calculated based on the detected pressure at the transition points P7, P8 and the period T6. Next, the relationship between the decrease rate Rγ in injection rate and the pressure increase rate Pγ is defined as the individual difference information A6, and the individual difference information A8 is stored in the IC memory 28 at S81.

Furthermore, detected pressure decrease Pβ caused in the time period (fifth period) T5 is calculated. The fifth period T5 is a time period from the time (fifth reference time) of the transition point P3, which is attributed to actual injection start R3, until the transition point P4, which is attributed to the maximum injection rate reach R4. The detected pressure decrease Pβ is the same as the pressure difference P3−P4. Therefore, the pressure difference P3−P4, which is calculated in the process at S41 in FIG. 6, may be used as the detected pressure decrease Pβ. The relationship between the calculated detected pressure decrease Pβ and the calculated maximum injection rate Rβ is defined as the individual difference information A7, and the individual difference information A7 is stored in the IC memory 26.

<Individual Difference Information B1, B2>

Next, the individual difference information B1, B2 is described in detail. The calculation process of the individual difference information B1, B2 and the writing process to the IC memory 26 are performed using the measuring instrument 53, similarly to the individual difference information A1 to A7.

The pressure sensor 20*a* is mounted to the injector 20. In the present structure, the pressure sensor 20*a* is located at the downstream of the common rail 12 with respect to the fuel flow in the fuel passage, which extends from the common rail 12 to the nozzle holes 20*f*. That is, the pressure sensor 20*a* is located close to the nozzle holes 20*f* in the fuel passage. Therefore, fluctuation, which is caused by the change in injection rate, can be obtained as information from the waveform of the detected pressure of the pressure sensor 20*a*. Here, the fluctuation, which is caused by the change in injection rate, may not be obtained in a structure where the pressure sensor 20*a* is located in the common rail 12.

As indicated by the examination result in FIG. 5, response delay (injection response time delay) T1 arises in the defection of the pressure fluctuation, which is caused in the nozzle holes 20*f*, using the pressure sensor 20*a*. The injection response time delay T1 is the time period from the pressure fluctuation arises in the nozzle holes 20*f* to the pressure fluctuation is transmitted to the pressure sensor 20*a*. Similarly, response delay (leak response time delay) Ta arises from the time point where fuel starts leaking from the leak hole 24 to the time point where fluctuation in detected pressure of the pressure sensor 20*a* is caused by the start of the fuel leakage.

Even in the same type of the injectors 20, individual difference is caused in the injection response time delay T1 and the leak response time delay Ta. The individual difference is attributed to the location of the pressure sensor 20*a*. Specifically, the individual difference is attributed to the fuel passage length La (FIG. 2) from the nozzle holes 20*f* to the pressure sensor 20*a*, the fuel passage length Lb (FIG. 2) from the leak hole 24 to the pressure sensor 20*a*, the passage cross-sectional area thereof, and the like. Therefore, when the creating of the injection control map and the fuel injection control are performed based on at least one of the injection response time delay T1 and the leak response time delay Ta, the accuracy of the injection control can be enhanced.

The individual difference information B1, B2 is defined by noting acquisition of such an injection response time delay T1 and such a leak response time delay Ta. Specifically, the individual difference information B1 represents the injection response time delay T1 from the time point R3, in which the actual injection is started, to the transition point P3, which is attributed to the actual injection start R3. The injection response time delay T1 is the same as the lapsed time T1 (first period). Therefore, the lapsed time T1, which is calculated in the process at S20 in FIG. 6, may be used as the injection response time delay T1.

The individual difference information B2 represents the leak response time delay Ta from the energization start time point Is, in which energization to the solenoid 20*b* is started, to the transition point P1, which is attributed to the start of fuel leak from the leak hole 24. In the present embodiment, it is regarded that the energization start time point Is, in which energization of the solenoid 20*b* is started, is the same as the time point in which fuel leak actually starts. Thus, the injection response time delay T1 and the leak response time delay Ta, which are calculated in this way, are respectively defined as the individual difference information B1, B2, and the individual difference information B1, B2 are stored in the IC memory 26.

Instead of defecting the injection response time delay T1 in the process at S20 in this way, the injection response time delay T1 may be calculated in the following manner. Specifically, the bulk modulus of elasticity K, which will be describe below, and the fuel passage length La, Lb may be measured. Subsequently, the injection response time delay T1 may be calculated from the bulk modulus of elasticity K and the fuel passage length La. And subsequently, the leak response time delay Ta may be calculated from the bulk modulus of elasticity K and the fuel passage length Lb.

The bulk modulus of elasticity K is equivalent to the bulk modulus of elasticity of fuel in the entire of the fuel path, which extends from an outlet port 11*e* of the high-pressure pump 11*a* to the nozzle hole 20*f* of each of the injectors 20(#1) to 20(#4). The bulk modulus of elasticity K satisfies the formula $\Delta P = K \cdot \Delta V/V$, wherein ΔP: change in pressure accompanied with change in volume of fluid, V: volume, and ΔV: change in volume from the volume V, in pressure change caused in specific fluid. The inverse number of the coefficient K is equivalent to the compression ratio.

As follows, one example of calculation of the injection response time delay T1 based on the passage length La and the bulk modulus of elasticity K is described. The injection response time delay T1 can be defined by the formula of T1=La/v, wherein the flow velocity of fuel is v. The flow velocity v can be calculated based on the bulk modulus of elasticity K. Similarly, the leak response time delay Ta can be defined by the formula of Ta=Lb/v. The flow velocity v can be calculated based on the bulk modulus of elasticity K.

Thus, the injection response time delay T1 and the leak response time delay Ta can be calculated by using the bulk modulus of elasticity K and the fuel passage length La, Lb as parameters in this way. Therefore, the parameters K, La, and Lb may be defined as the individual difference information B1, B2 instead of the injection response time delay T1 and the leak response time delay Ta, and the parameters K, La, and Lb may be stored in the IC memory 26. The bulk modulus of elasticity K is equivalent to a first parameter and a second parameter. The fuel passage length La is equivalent to the first parameter. The fuel passage length Lb is equivalent to the second parameter.

<Individual Difference Information C1 to C3>

Next, the individual difference information C1 to C3 is described in detail with reference to FIGS. 8 to 12. The calculation process of the individual difference information C1 to C3 and the writing process to the IC memory 28 are performed using the measuring instrument 53, similarly to the individual difference information A1 to A7. FIG. 8 shows an examination result, which is obtained similarly to the examination result in FIG. 5. In each of FIGS. 9 to 12, the upper timing chart shows the instruction signal as the driving current with respect to the injector 20, and the lower timing chart shows a waveform indicating the fluctuation in detected pressure attributed to the instruction signal.

Here, to perform a multi-stage injection control so as to conduct multiple fuel injection within one burning cycle, it is necessary to care about the following subject. As enclosed by the dashed dotted line Pe in FIG. 8, the fluctuation pattern of the former-stage injection and the fluctuation pattern of the latter-stage injection are partially overlapped one another to cause interference. Specifically, the fluctuation pattern of the fluctuation waveform, which corresponds to the n-th injection, is overlapped with the end portion of the fluctuation waveform, which is accompanied with the m-th injection after the end of the injection. The n-th injection is subsequent to the first injection. The m-th injection is in advance of the n-th injection. In the present embodiment, the m-th injection is the first injection. Hereafter, the fluctuation pattern is referred to a post-injection fluctuation pattern Pe.

Figure 9:
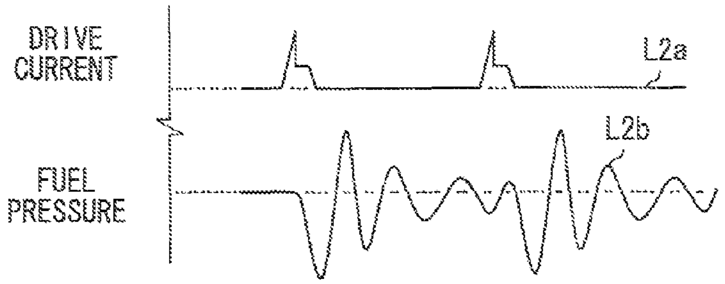
FIG. 9 is a timing chart showing the injection characteristic according to the first embodiment.

In further detail, when injection is performed twice as shown in FIG. 9, the fluctuation waveform shown by the solid line L2*b* is generated with respect to the energization pulse shown by the solid line L2*a* in FIG. 9. As for the two injections indicated in FIG. 23, the pulsation pattern, which is attributed only to the latter-stage injection, and the pulsation pattern of the former-stage injection at the former-stage side interfere with each other in the vicinity of the start timing of the latter-stage injection. Accordingly, it is difficult to recognize the pulsation pattern, which is attributed only to the latter-stage injection.

Figure 10:
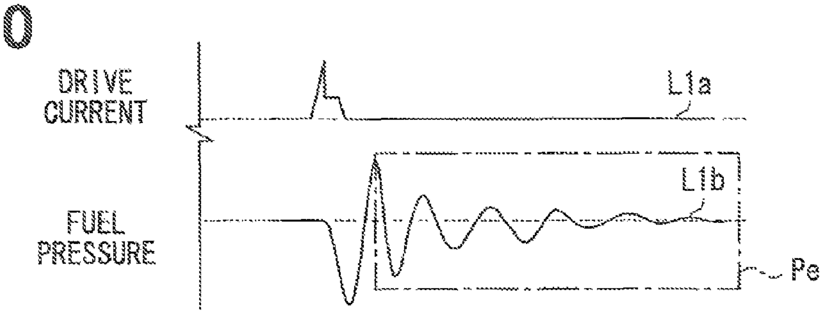
FIG. 10 is a timing chart showing the injection characteristic according to the first embodiment.
Figure 11:
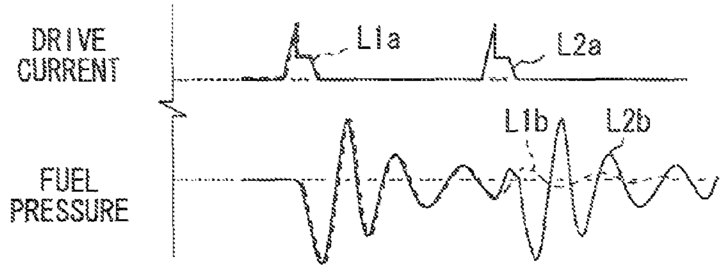
FIG. 11 is a timing chart showing the injection characteristic according to the first embodiment.
Figure 12:
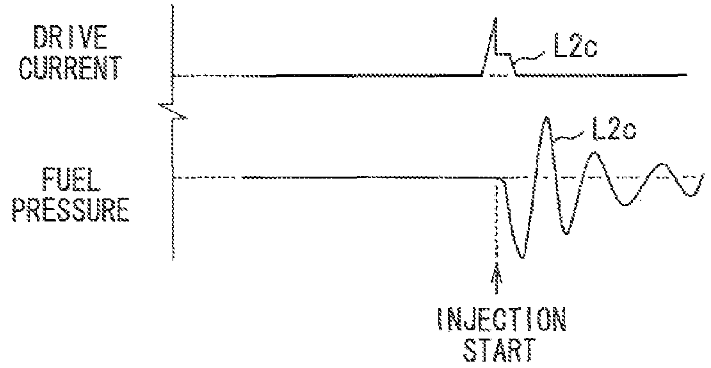
FIG. 12 is a timing chart showing the injection characteristic according to the first embodiment.

As shown in FIG. 10, when only the former-stage injection is performed, the fluctuation waveform shown by the solid line L1*b* is generated with respect to the energization pulse shown by the solid line L1*a* in FIG. 10. FIG. 11 shows the solid lines L2*a*, L2*b*, which respectively depict the fluctuation waveforms in FIG. 9, and the dashed lines L1*a*, L1*b*, which respectively depict the fluctuation waveforms in FIG. 10. As shown in FIG. 12, the fluctuation pattern shown by the solid line L2*c*, which is attributed only to the latter-stage injection, can be extracted by subtracting the fluctuation waveform L1*b* in FIG. 10 from the corresponding portion of the fluctuation waveform L2*b* in FIG. 3.

The individual difference information C1 to C3 is needed for extracting the fluctuation pattern L2*c*, which is attributed only to the latter-stage injection. That is, the individual difference information C1 to C3 is related to the post-injection fluctuation pattern Pe (FIG. 8), which is included in the fluctuation waveform of the detected pressure of the pressure sensor 20*a*, the fluctuation waveform being accompanied with one fuel injection. Referring, to FIG. 8, the individual difference information C1 represents the amplitude 8 of the post-injection fluctuation pattern Pe, and the individual difference information C2 represents the cycle T7 of the post-injection fluctuation pattern Pe.

The individual difference information C3 represents a partial fluctuation pattern Py, which is shown by the solid line in FIG. 8. The partial fluctuation pattern Py appears at a cycle shorter than the cycle of a sine waveform Px shown by the dotted line in FIG. 8. The sine waveform Px is calculated from the amplitude S and the cycle T7 of the post-injection fluctuation pattern Pe. For example, the individual difference information C3 may be obtained by subtracting each portion of the fluctuation pattern Py from each corresponding portion of the sine waveform Px. Alternatively, information, which is related to attenuation such as an attenuation factor of the post-injection fluctuation pattern Pe, may be used as the individual difference information.

Preferably, in a case where a value included in each individual difference information A1 to A7, B1, B2, C1 to C3 exceed a predetermined upper limit, it is determined that a malfunction is caused. Specifically, for example, the measuring instrument 53 or the like may determine a malfunction to be caused in a case where the amplitude S and the cycle T7 of the post-injection fluctuation pattern Pe exceed the upper limit thereof.

As described above, this embodiment produces the following preferable effects.

(1) The injection response time delay T1 and the leak response time delay Ta as the individual difference information B1, B2 are stored in the IC memory 26. Therefore, the individual difference information B1, B2 can be reflected on the injection control map, and the injection control can be performed in accordance with the present injection control map. Therefore, according to the present embodiment, the injection state of the injector 20 can be controlled with high accuracy, compared with a conventional device, which stores the Tq–Q characteristic as individual difference information and performs an injection control using the pre-stored Tq–Q characteristic.

(2) The individual difference information A1 to A7 is stored in the IC memory 26. The individual difference information A1 to A7 represents the relationship between the change in injection rate (injection state) in the period between the actual injection start R3 and the actual injection end R8 and the fluctuation in detected pressure of the pressure sensor 20*a* in the range between the transition points P1, P8, the fluctuation being attributed the fuel injection. In the present structure, the individual difference information A1 to A7 can be reflected on the injection control map, and the injection control can be performed in accordance with the present injection control map. Therefore, the injection state of the injector 20 can be controlled with high accuracy.

(3) The information related to the post-injection fluctuation pattern Pe as the individual difference information C1 to C3 is stored in the IC memory 26. In the present structure, the individual difference information C1 to C3 can be reflected on the injection control map, and the injection control can be performed in accordance with the present injection control map. Therefore, the injection state of the injector 20 can be controlled with high accuracy.

(4) In the examination for obtaining the individual difference information, the injector 20 is combined with the corresponding pressure sensor 20*a* in the state where multiple injectors 20(#1) to 20(#4) are mounted to the engine. Specifically for example, the injector of 20(#1) is combined with the pressure sensor 20*a* of the cylinder (#1) in the present examination. Therefore, the detection characteristic of the pressure, sensor 20*a*, which is used in an actual engine operation, is reflected on the individual difference information A1 to A7. Thus, the injection state of the fuel injection valve can be controlled with high accuracy.

(5) The pressure sensor 20*a* is mounted to the injector 20. Therefore, the pressure sensor 20*a*, which is used in the injection characteristic examination before the factory shipment, can be restricted from being mounted to an injector 20, which is other than the corresponding injector 20. Specifically, for example, the pressure sensor 20*a*, which corresponds to the injector 20(#1) can be restricted from being mounted to one of the injector 20(#2) to 20(#4). Thus, an erroneous assembly can be restricted. In addition, in the present structure, the location of the pressure sensor 20*a* is closer to the nozzle holes 20*f*, compared with the structure in which the pressure sensor 20*a* is mounted to the high-pressure pipe 14, which connects the common rail 12 with the injector 20. Therefore, the pressure fluctuation at the nozzle holes 20*f* can be further accurately detected, compared with a structure in which the pressure fluctuation, which has been attenuated through the high-pressure pipe 14, is detected.

Second Embodiment

In the present embodiment, a master injector 20*m* and a master sensor 20*am*, which are different from the injector 20 and the pressure sensor 20*a* as examined objects, are prepared. The master injector 20*m* and the master sensor 20*am* are equivalent to a master device. The characteristic of the master device is beforehand measured through an examination to obtain a reference characteristic as a reference period. An error of each of the characteristics of the injector 20 and the pressure sensor 20*a* with respect to the reference characteristic is measured. The measured error as the individual difference information is stored in the IC memory 26 as a storage unit (memory unit). The injector 20 and the pressure sensor 20*a* are respectively equivalent to examined object devices.

The designed structure of the master injector 20*m* is the same as the designed structure of the injector 20 as the examined object. The designed location of the pressure sensor with respect to the master injector 20*m* is also the same as the designed location of the pressure sensor 20*a* with respect to the injector 20 as the examined object. However, the injection response time delay T1 and the like have a variation, which is caused by the individual difference in both the injectors, the individual difference in the pressure sensors 20*a*, variation in location of the pressure sensor 20*a*, and the like. In the present embodiment, such variation is defined as the characteristic.

Hereafter, the reference characteristic and the error are described with reference to FIG. 13.

Figure 13:
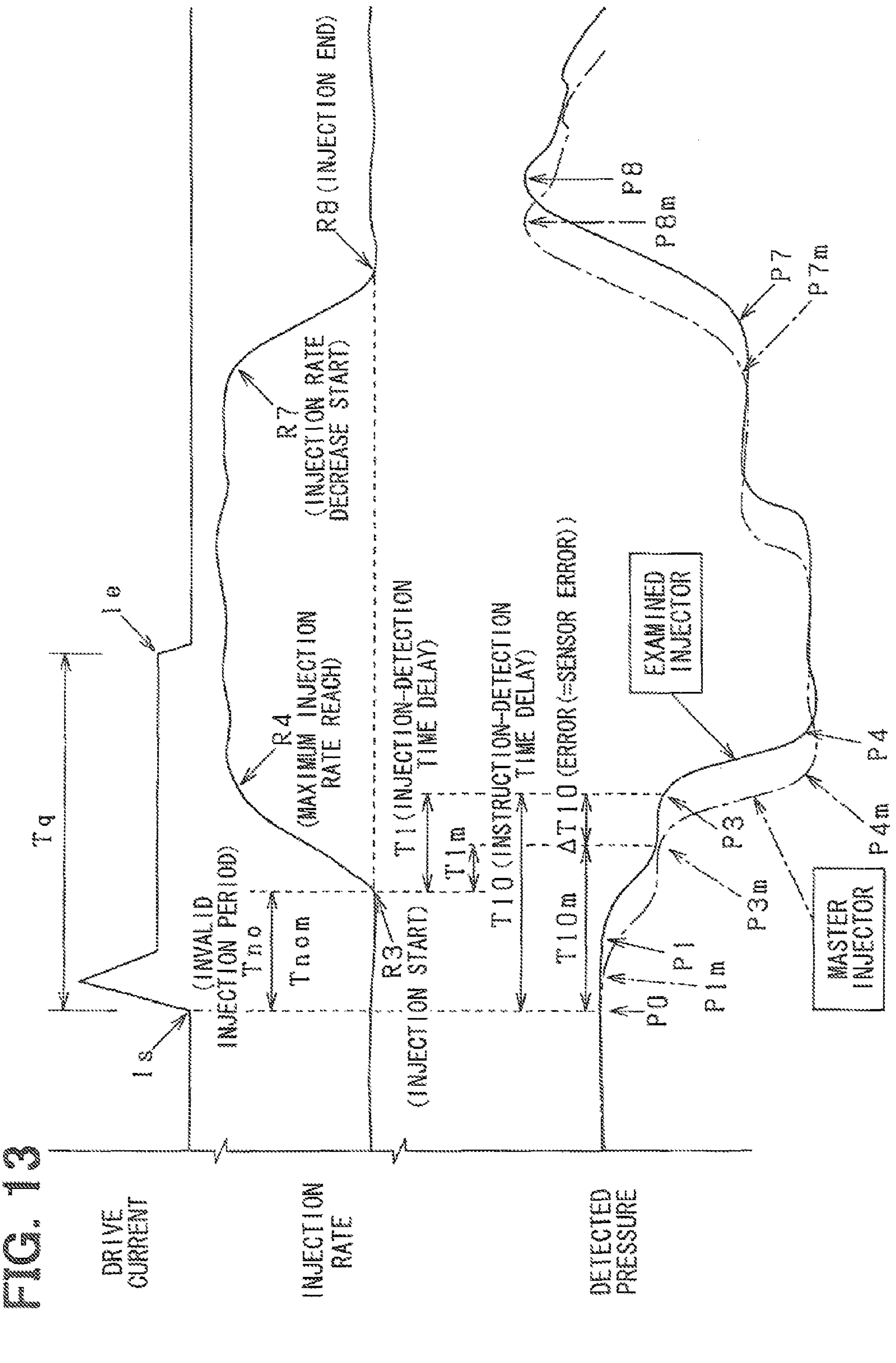
FIG. 13 is a timing chart showing a reference characteristic and error with respect to a master device according to a second embodiment.

The dashed dotted line in FIG. 13 indicates an examination result of the master device obtained by conducting the measurement process in FIG. 4. In the example shown in FIG. 13, as shown by the top and bottom charts, the phase is shifted so that the change in defected pressure of the master sensor 20*am* appears earlier than the change in detected pressure of the pressure sensor 20*a* as the examined object shown by the solid line. In the bottom chart in FIG. 13, the transition points of the change in detected pressure of the master sensor 20*am* are indicated by the reference numerals P1*m*, P3*m*, P4*m*, P7*m*, P8*m*. The transition points P1*m*, P3*m*, P4*m*, P7*m*, P8*m* respectively correspond to the transition points P1, P3, P4, P7, P8 of the change in detected pressure of the pressure sensor 20*a* as the examined object.

In the example in FIG. 13, an invalid injection period Tno is a time period from the energization start time point is, at which the injection start instruction signal is outputted to the solenoid 20*b*, to the actual injection start point R3. In the invalid injection period Tno, an invalid injection period Tnom of the master injector 20*m* is the same as an invalid injection period Tno of the injector 20 as the examination object.

The master device has an instruction-defection time delay T10*m*. The instruction-detection time delay T10*m* is a time period from the energization start time point is, at which the injection start instruction signal is outputted to the solenoid 20*b*, to the time point P3*m*, at which the detected pressure of the pressure sensor 20*a* causes the fluctuation attributed to the fuel injection start. In present embodiment, the instruction-detection time delay T10*m* is defined as a reference period as the reference period. Such a reference period T10*m* of the master device is beforehand measured. In addition, an instruction-detection time delay T10 of the examined object device, which includes the object injector 20 and the pressure sensor 20*a* as the examined objects, is also measured. An error ΔT10 of the instruction-detection time delay T10 of the examined object device with respect to the reference period T10*m* of the master device is calculated as the instruction-detection error. The error ΔT10 is stored in the IC memory 26.

First, the injection control map is created suitably to conformed values, which are obtained by conducting various examinations for the master device. Next, the injection control map, which is conformed to the master device, is corrected according to the instruction-detection error ΔT10, which is stored in the IC memory 26. Specifically, the injection control map is corrected so that the injection pattern, which is stored in the injection control map, is advanced or retarded according to the instruction-detection error ΔT10.

As described above, according to the present embodiment, the injection control map can be corrected in accordance with the conformed values by measuring the instruction-detection time delay T10 for the examined object device. Therefore, the injection rate shown by the middle chart in FIG. 13 need not be examined for the injector 20 as the examined object. Therefore, the preparing process of the injection control map can be enhanced in efficiency.

Third Embodiment

In present embodiment, in addition to the creation of the injection control map described in the second embodiment, a malfunction of the examined object device is also detected.

Figure 14:
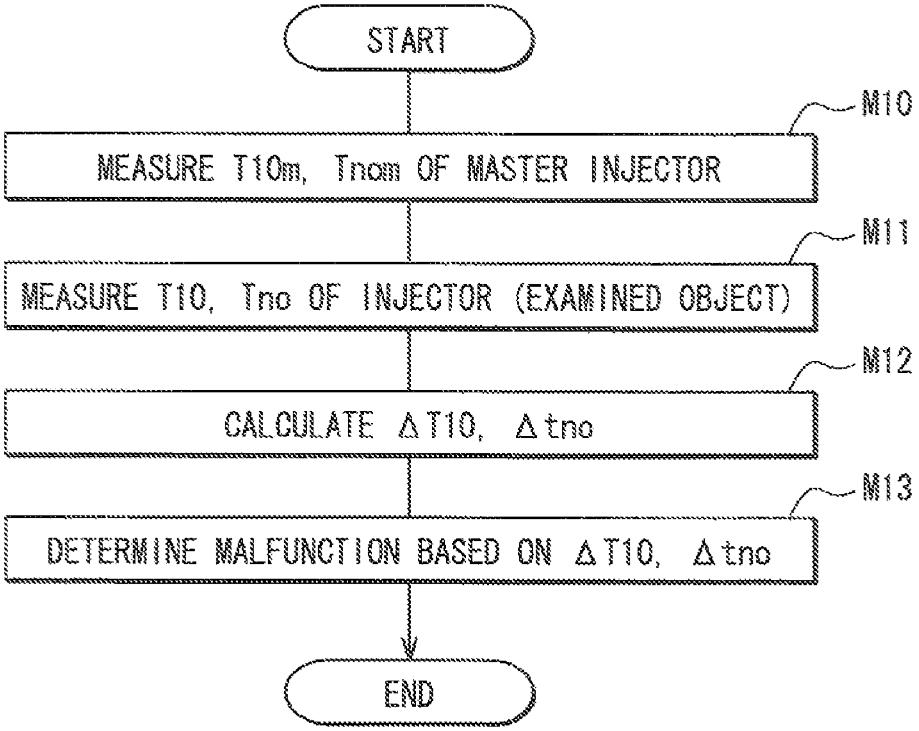
FIG. 14 is a flowchart showing a procedure for determining a malfunction caused in a fuel injection device as an examined object according to a second embodiment.

The process related to the present malfunction detection is performed by a measurement operator using the measuring instrument 53 in FIG. 4. FIG. 14 shows the malfunction detection process. The present process may be performed at a manufacturing factory in the state where the injector 20 is mounted with the pressure sensor 20*a* and before the injector 20 is shipped from the factory. Alternatively, the present process may be performed at a service factory, in which various kinds of repair works and inspections are conducted, after the shipment of the injector 20 to a market, for example.

First, at M10 as a first measurement procedure, the instruction-injection time delay Tnom as a reference invalid period of the master injector 20*m*, which is mounted with the master sensor 20*am* as the master device, is measured. The instruction-injection time delay Tnom is the time period from the energization start time point Is to the fuel injection start time R3. At M10, the reference period T10*m* is also measured.

Next, at M11 as a second measurement procedure, the instruction-injection time delay Tno as the invalid period and the instruction-detection time delay T10 of the injector 20 as the examined object device are measured. The present injector 20 is mounted with the pressure sensor 20*a* as the examined object.

Next, at M12, an error ΔT10 of the instruction-detection time delay T10 of the examined object device with respect to the reference period T10*m* of the master device is calculated. At M12, an error ΔTno of the invalid period Tno of the examined object device with respect to the reference invalid period Tnom of the master device is also calculated.

Next, at M13 as a malfunction determination procedure, when the error ΔT10 of the instruction-detection time delay T10 is larger than a predetermined threshold thT10, the examined object device is determined to have caused a malfunction. In addition, it is further determined which one of the injector 20 and the pressure sensor 20*a* has caused the malfunction in such a manner described below.

The error ΔT10 of the instruction-detection time delay T10 includes an invalid error and a sensor error. The invalid error is attributed to the individual difference variation of the injector 20. The sensor error is attributed to variation in location of the pressure sensor 20*a* and variation in individual difference of the pressure sensor 20*a*. At M13, in consideration of the invalid error and the sensor error, it is further determined which one of the injector 20 and pressure sensor 20*a* has caused the malfunction based on the error ΔT10 of the instruction-detection time delay T10 and the error ΔTno of the invalid period Tno. For example, in the case where the examined object device is determined to have caused a malfunction, when the error ΔTno of the invalid period Tno is smaller than a predetermined threshold, the pressure sensor 20*a* is determined to have caused a malfunction.

reference fluctuation modeAs described above, according to present embodiment, the fuel injection device as the examined object can be easily determined to have caused a malfunction. In addition, if is easily determined whether the malfunction is caused in the pressure sensor 20*a*. In the present embodiment, in the case where if is not determined which device has caused a malfunction, measurement of the injection rate of the examined object device can be omitted.

Fourth Embodiment

Figure 15:
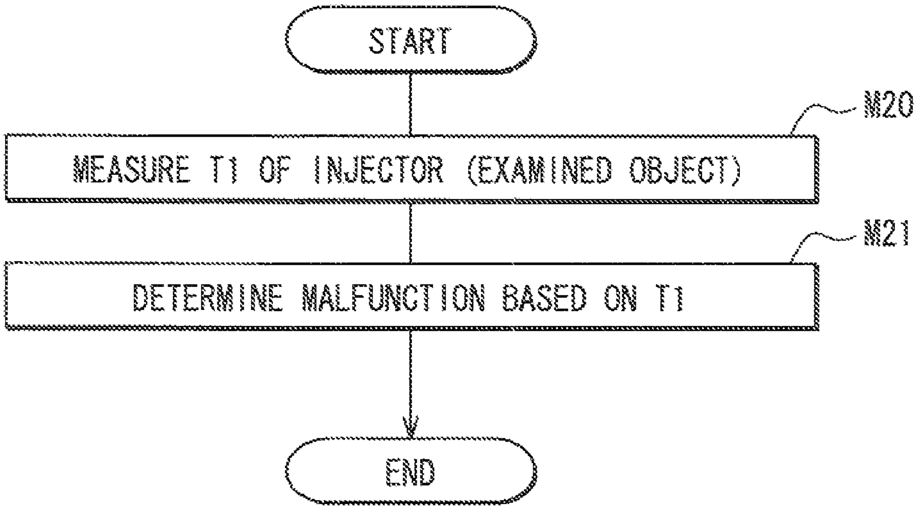
FIG. 15 is a flowchart showing a procedure for determining a malfunction caused in a fuel injection device as an examined object according to a third embodiment.

FIG. 15 shows a procedure of a malfunction detection process according to the present embodiment. The present malfunction detection process is performed by a measurement operator using the measuring instrument 53 in FIG. 4. The present malfunction detection process may be performed at a manufacturing factory in the state where the injector 20 is mounted with the pressure sensor 20*a* and before the injector 20 is shipped from the factory. Alternatively the present process may be performed at a service factory, in which various kinds of repair works and inspections are conducted, after the shipment of the injector 20 to a market, for example.

First, at M20 as a measurement procedure, the injection response time delay T1 (refer to FIG. 5) of the injector 20 as the examined object device is measured. The present injector 20 is mounted with the pressure sensor 20*a* as the examined object. Next, at M21 as a malfunction determination procedure, when the measured injection response time delay T1 is larger than a predetermined threshold thT1, the examined object device is determined to have caused a malfunction. Therefore, according to present embodiment, it is easily determined whether the pressure sensor 20*a* as the examined object have caused a malfunction.

Other Embodiments

The present invention is not limited to the above embodiments. The features of the embodiments may be arbitrarily combined.

In addition to the decrease and increase in detected pressure, variations in decrease and increase in detected pressure may be stored in the IC memory 26 as individual difference information A8. Specifically, for example, when the examination in FIG. 5 is conducted for multiple times under the same condition, variation may be caused in the obtained result of the fluctuation waveform of the detected pressure. For example, such a variation may be combined with the individual difference information A1 to A7 and may be stored.

The start point of the post-injection fluctuation pattern Pe may be stored in the IC memory 26 as the individual difference information C4, which is related to the post-injection fluctuation pattern Pe, together with the individual difference information C1 to C3. Preferably, the start point is the transition point P8, which is attributed to the actual injection end, in the fluctuation waveform of the detected pressure of the pressure sensor 20*a*, the fluctuation waveform being accompanied with one fuel injection.

In the above embodiments, the first to fourth reference point is defined as the actual injection start point R3. Alternatively, the actual injection start point R3 may be defined as another time point. The fifth and sixth reference point may be also defined as another time point dissimilarly to the above embodiments. In the above embodiments, the period from the transition point P7 to the transition point P8 is defined as the injection rate decrease period T6, and the pressure increase rate Pγ is calculated based on the pressure increase in the injection rate decrease period T6. Alternatively, another period, which is included in the period between the transition points P7 to P8 may be defined as the injection rate decrease period, and the pressure increase rate Pγ may be calculated based on the pressure increase in the present injection rate decrease period. Similarly, another period, which is included between the transition points P3 to P4, may be defined as the injection rate increase period, and the pressure decrease rate Pα may be calculated based on the pressure decrease in the injection rate increase period.

In the embodiment, the IC memory 26 is employed as the storage unit (memory unit) for storing the individual difference information. Alternatively another memory storage such as a device using the QR code (registered trademark), may be employed as the storage unit.

In the above embodiments, the IC memory 26 as the storage unit is mounted to the injector 20. Alternatively, the IC memory 26 may be mounted to a component other than the injector 20. Preferably, at the time of the factory shipment of the injector 20, the injector 20 is integrally mounted with the storage unit.

The injector 20 may be provided with a piezo actuator, instead of the solenoid actuator shown in FIG. 2. A direct-acting injector may be also used. The direct-acting injector is operated without pressure leak from the leak hole 24 or the like, and a hydraulic pressure chamber Cd is not used to transmit driving power. The direct-acting injector may be a direct-acting piezo injector developed in recent years, for example. When the direct-acting injector is employed, the injection rate can be easily controlled.

In the above embodiments, the pressure sensor 20*a* is mounted to the fuel inlet hole 22 of the injector 20. Alternatively, as shown by the dashed dotted line 200*a* in FIG. 2, a pressure sensor 200*a* may be mounted to the inside of the housing 20*e*, and fuel pressure in the fuel passage 25, which extends from the fuel inlet hole 22 to the nozzle holes 20*f*, may be defected.

Further in the case where the fuel inlet hole 22 is mounted with the pressure sensor as described above, the mounting structure of the pressure sensor 20*a* can be simplified, compared with the structure in which the inside of the housing 20*e* is mounted with the pressure sensor. On the other hand, in the structure in which the inside of the housing 20*e* is mounted with the pressure sensor, the location of the pressure sensor 20*a* is closer to the nozzle holes 20*f*, compared with the structure in which the fuel inlet hole 22 is mounted with the pressure sensor. Therefore, pressure fluctuation in the nozzle holes 20*f* can be further properly detected.

The pressure sensor 20*a* may be mounted to the high-pressure pipe 14, in this case, the pressure sensor 20*a* is preferably mounted to the location at a predetermined distance from the common rail 12.

A flow regulating unit may be provided to a connection between the common rail 12 and the high-pressure pipe 14 for regulating fuel flow from the common rail 12 to the high-pressure pipe 14. The present flow regulating unit is configured to blockade the passage when excessive fuel outflow is caused by for example, fuel leak due to damage in the high-pressure pipe 14, the injector 20, or the like. For example, the flow regulating unit may be a valve element such as a ball element, which is configured to blockade the passage in the case of excessive flow. A flow damper, which is constructed by integrating the orifice 12*a* with the flow regulating unit, may be employed.

The pressure sensor 20*a* may be located downstream of the orifice and the flow regulating unit with respect to the fuel flow. Alternatively, the pressure sensor 20*a* may be located downstream of at least one of the orifices and the flow regulating unit.

According to the above embodiments, in the examination shown in FIG. 4, pressure being changed by test-injected fuel, is defected using the strain gauge 51. Alternatively, a pressure sensor, which is provided in the vessel 50, may be used for defecting the pressure, instead of the strain gauge 51.

In the examination shown in FIG. 4, the change in injection rate of fuel may be estimated from the change in detection result (detected pressure) of the pressure sensor 20*a*. Further, the estimation result may be compared with the actual change in injection rate, which is obtained by using the strain gauge 51 or the pressure sensor for the examination. In this case, the deviation between the estimation result and the actual change may be reflected on the creation of the individual difference information A1 to A7, B1, B2, C1 to C3.

The number of the fuel pressure sensor 20 may be arbitrary determined. For example, two or more sensors may be provided to a fuel passage for one cylinder. In the above embodiments, the pressure sensor 20*a* is provided to each cylinder. Alternatively, the pressure sensor 20*a* may be provided to only a part of the cylinders. For example, the pressure sensor 20*a* may be provided to only one cylinder. In this case, fuel pressure for other cylinders may be estimated based on the sensor output of the pressure sensor 20*a*.

In the obtaining of the sensor output of the pressure sensor 20*a* by using the measuring instrument 53 in the examination or by using the ECU 30 in an operation of the internal combustion engine at the time of injection control, the sensor output is preferably obtained at an interval such as 20 microseconds for recognizing the tendency of the pressure fluctuation. In this case, the interval is preferably shorter than 50 microseconds.

It is also effective to additionally provide a rail pressure sensor for detecting pressure in the common rail 12, in addition to the pressure sensor 20*a*. In the present structure, the rail pressure in the common rail 12 can be further obtained. In addition to the pressure detected by the pressure sensor 20*a*. Thus, the fuel pressure can be detected at higher accuracy.

The type of the engine and the system configuration as the controlled object may be also arbitrary changed according to the application or the like. According to the embodiments, the device and system are applied to the diesel engine as one example. Alternatively, the device and system are applicable to a spark ignition gasoline engine, in particular a direct-injection engine, for example. In a fuel injection system for a direct fuel-injection gasoline engine, a delivery pipe is provided for storing gasoline at high-pressure, in this case, high-pressure fuel is fed from the fuel pump to the delivery pipe, and the high-pressure fuel is distributed from the delivery pipe to the multiple injectors 20 and injected into the combustion chambers of the engine, in such a system, the delivery pipe is equivalent to the pressure-accumulation vessel. The device and system are not limited to be used for the control of a fuel injection valve, which injects fuel directly in a cylinder. The device and system may be used for a fuel injection valve, which injects fuel to an engine intake passage or an exhaust passage.

In the third embodiment, it is determined to have caused a malfunction in the case where the error ΔT10 exceeds the threshold thT10. In the present determination of the third embodiment, the threshold thT10 may be set as a variable value. For example, the threshold thT10 may be set in a variable manner in accordance with pressure of fuel supplied to the injector when the reference period T10*m* and the instruction-detection time delay T10 are measured.

As described in the above embodiments, the fuel injection device is configured to be supplied with fuel from a pressure-accumulation vessel (12). The fuel injection device includes the fuel injection valve (20) for injecting fuel, which is distributed from the pressure-accumulation vessel (12). The fuel injection device further includes the pressure sensor (20*a*) located in the fuel passage (25), which extends from the pressure-accumulation vessel (12) to the nozzle hole (20*f*) of the fuel injection valve (20), and configured to detect pressure of fuel, the pressure sensor (20*a*) being located closer to the nozzle hole (20*f*) than the pressure-accumulation vessel (12). The fuel injection device further includes the storage unit (26) for storing individual difference information, which indicates the injection characteristic of the fuel injection valve (20), the injection characteristic being obtained by an examination. The individual difference information includes injection response delay information, which indicates at least one of the injection response time delay (T1) and the first parameter (La, K, ΔT10). The injection response time delay (T1) is the time period from the injection start point (R3), at which fuel injection through the nozzle hole (20*f*) starts, to the time point (P3), at which the fluctuation occurs in detected pressure of the pressure sensor (20*a*), the fluctuation being attributed to the start of fuel injection. The first parameter (La, K, ΔT10) is required for calculating the injection response time delay (T1).

Pressure of fuel in the nozzle hole of the fuel injection valve is changed through the injection of fuel. In such a nozzle hole, pressure fluctuation has a high correlation with the injection state such as the actual injection start point, the maximum injection rate reach point, and the like. The inventor noted the present subject and conducted a study to specifically detect the injection state other than the injection quantify Q by detecting the pressure fluctuation. However, in the device according to JP-A-2008-200378, the pressure sensor as the rail pressure sensor is located at the pressure-accumulation vessel for detecting pressure of fuel in the pressure-accumulation vessel. Accordingly, the pressure fluctuation attributed to the injection may be attenuated within the pressure-accumulation vessel. Therefore, it is difficult to detect the pressure fluctuation with sufficient accuracy in such a conventional device.

On the contrary, according to the present structure, the pressure sensor is located in the fuel passage, which extends from the pressure-accumulation vessel to the nozzle hole of the fuel injection valve. The pressure sensor is located closer to the nozzle hole than the pressure-accumulation vessel. Therefore, the pressure sensor is capable of detecting pressure in the nozzle hole, before the pressure is attenuated in the pressure-accumulation vessel. Therefore, the pressure fluctuation attributed to the injection can be defected with sufficient accuracy. Thus, the injection state can be specifically detected based on the detection result. In the present structure, the injection state of the fuel injection valve can be specifically controlled with high accuracy.

Here, in the detection of the pressure fluctuation, which is caused in the nozzle hole, using the pressure sensor detecting, the response delays for a time period from a time point, at which the pressure fluctuation occurs in the injection holes 20*f*, to the time point, at which the pressure fluctuation is transmitted to the pressure sensor 20*a*. Therefore, when the injection state is detected using the defection result of the pressure sensor as described above, consideration of the response delay time (injection response time delay (T1)) is needed in estimation of the injection state from the detection result. However, even in the same type of the fuel injection valves, such an injection response time delay (T1) has an individual difference, which is attributed to the location of the pressure sensor and the like. That is, the individual difference is attributed to the fuel passage length from the nozzle hole to the pressure sensor.

Furthermore, in the above embodiments, the storage unit stores injection response delay information, which represents the injection response time delay (T1), which is a time period from a time point, at which fuel injection through the nozzle hole starts, to a time point, at which a fluctuation occurs in detected pressure, the fluctuation being attributed to the fuel injection start, and the like. The injection response time delay (T1) is the individual difference information obtained by an examination conducted for each fuel injection valve. For example, the injection response delay information (T1) and the like may be obtained before the factory shipment of the present fuel injection valve. The obtained injection response delay information in the examination may be stored as the individual difference information to the storage unit. Thus, the injection state can be controlled based on the injection response delay information (T1), which are apt to cause an individual difference, as the individual difference information, which is obtained as a result of the beforehand examination, in the present structure, the injection state of the fuel injection valve can be specifically controlled with high accuracy.

Here, the detection characteristic of the pressure sensor also has an individual difference. Specifically, even in the same type of the pressure sensor, the output voltage with respect to the same pressure may differ. Therefore, in the examination before the factory shipment, when the examination is conducted using a different pressure sensor from the pressure sensor, which is actually mounted to the fuel injection device, the detection characteristic of the pressure sensor, which is used in the actual operation of the internal combustion engine, may not be reflected on the individual difference information. In view of the foregoing, according to the above embodiments, the individual difference information includes injection response delay information, which indicates at least one of an injection response time delay (T1). That is, the examination for a combination of the detected pressure of the pressure sensor and the fuel injection valve of the fuel injection device is conducted, and the individual difference information, which is obtained as a result of the examination, is used. Therefore, the defection characteristic of the pressure sensor, which is used in an actual engine operation, is reflected on the individual difference information. Thus, the injection state of the fuel injection valve can be controlled with high accuracy.

According to the above embodiments, the individual difference information includes the first parameter (La, K). At least one of the first parameter (La, K) is the instruction-detection error of an object instruction-defection time delay (T10) with respect to a reference instruction-defection time delay (T10*m*) as the reference period of the master sensor (20*am*) of the master fuel injection valve (20*m*). The object instruction-detection time delay (T10) is obtained by an examination of the fuel injection valve (20) and the pressure sensor (20*a*) as the examined objects, which are different from the master fuel injection valve (20*m*) and the master sensor (20*am*). Each of the object instruction-detection time delay (T10) and the reference instruction-detection time delay (T10*m*) is the time period from the time point (Is), at which the injection start instruction signal is outputted, to the time point (P3, P3*m*), at which fluctuation occurs in the detected pressure, the fluctuation being attributed to the start of fuel injection through the nozzle hole (20*f*).

In the present structure, by beforehand detecting the injection state of both the master injection valve and the master sensor as master devices as a known value, the injection-response delay time (T1) of the fuel injection valve as the examined object can be calculated based on the known value and the instruction-detection error (ΔT10). The known value may be the injection-detection time delay T1*m* in FIG. 13 from the fuel injection start though the nozzle hole to the time point at which fluctuation occurs in the detected pressure of the pressure sensor, the fluctuation being attributed to the fuel injection start, in this case, the response time delay T1 can be calculated by adding the injection-detection time delay T1*m* of the master device to the injection-detection error ΔT10, which is stored in the storage unit.

Furthermore, according to the present structure, the above embodiments, the conformed value with respect to the fuel injection valve as the examined object can be easily obtained by measuring a conformed value, which includes various parameters for various control of the engine and conformed to the master devices and by correcting the conformed value based on the instruction-detection error ΔT10 stored in the storage unit. The various parameters include, for example, the engine rotation speed NE, an optimal injection patterns with respect to the engine load, and the like. The optimal injection patterns may include the injection quantity, the injection timing and the like in a single injection. The optimal injection patterns may include the injection quantity, the injection timing, and the like in each stage in a multi-stage injection.

According to the above embodiments, the individual difference information includes at least one of the invalid error and the sensor error, which are obtained by an examination of the fuel injection valve (20) and the pressure sensor (20*a*) as the examined objects. The invalid error is an object instruction-injection time delay (Tno) with respect to a reference instruction-injection time delay (Tnom) as a reference invalid period of the master fuel injection valve (20*m*) and the master pressure sensor (20*am*). The sensor error is obtained by subtracting the invalid error from the instruction-detection error (ΔT10). Each of the object instruction-injection time delay (Tno) and the reference instruction-injection time delay (Tnom) is a time period from a time point (Is), at which the injection start instruction signal is outputted, to the injection start point (R3).

The instruction-detection error includes the invalid error and the sensor error. The invalid error is attributed to the individual difference variation of the injector. The sensor error is attributed to variation in location of the pressure sensor and variation in individual difference of the pressure sensor. In the example of FIG. 13, since the invalidity error is zero, the instruction-detection error ΔT10 is equal to the sensor error ΔT10. Therefore, in the present structure, in which the invalidity error or the sensor error are stored in the storage unit in addition to the instruction-defection error ΔT10, the items of the invalidity error contained in the instruction-detection error and the sensor error can be also obtained as information. Thus, the injection state of the fuel injection valve can be further specifically controlled with high accuracy.

According to the above embodiments, the fuel injection valve (20) has the control chamber (Cb) having the fuel inlet hole (22) and the leak hole (24). The fuel inlet hole (22) is configured to be supplied with fuel distributed from the pressure-accumulation vessel (12), the fuel injection valve (20) includes the control valve configured to open and close the leak hole (24) so as to return fuel to a fuel tank. The fuel injection valve (20) includes the needle valve for opening and closing the nozzle hole (20*f*), the control valve is configured to control pressure of fuel in the control chamber (Cb) so as to manipulate the needle valve. The individual difference information includes leak response delay information, which indicates at least one of a leak response time delay and a second parameter (Lb, K). The leak response time delay is a time period from a time point, at which fuel leak through the leak hole (24) starts, to a time point, at which a fluctuation occurs in detected pressure of the pressure sensor (20*a*), the fluctuation being attributed to the start of fuel leak. The second parameter (Lb, K) is required for calculating the leak response time delay.

Therefore, in the present structure, the storage unit stores leak response delay information, which represents the leak response time delay (T1), which is a time period from a time point, at which fuel leak through the leak hole starts, to a time point, at which a fluctuation occurs in detected pressure, the fluctuation being attributed to the fuel leak start, and the like. The leak response time delay (T1) is the individual difference information obtained by an examination. For example, the leak response delay information (Ta) and the like may be obtained before the factory shipment of the present fuel injection valve. The obtained injection response delay information in the examination may be stored as the individual difference information to the storage unit. Thus, the injection state can be controlled based on the leak response delay information (Ta), which is apt to cause an individual difference, as the individual difference information, which is obtained as a result of the beforehand examination. In the present structure, the injection state of the fuel injection valve can be specifically controlled with high accuracy.

According to the above embodiments, for example, the first parameter (La, K), which is required to calculate the injection-response delay time (T1), is a passage length (La) from the nozzle hole (20*f*) to the pressure sensor (20*a*). Alternatively, for example, the second parameter (Lb, K), which is required to calculate the leak-response delay time (Ta), is a passage length (Lb) from the leak hole (24) to the pressure sensor (20*a*). Alternatively, the at least one of the first parameter or the at least one of the second parameter, which is required to calculate the injection-response delay time (T1) or the leak-response delay time (Ta) is, for example, a bulk modulus of fuel in the entire of a passage, which extends from an outlet port (11*e*) of a high-pressure pump (11*a*), which supplies fuel to the pressure-accumulating vessel, to the nozzle hole.

According to the above embodiments, the control unit (30) is provided for controlling the fuel injection valve (20) based on the individual difference information. The control unit (30) determines that a malfunction occurs when an instruction-response time delay (T10) is larger than a threshold. The instruction-response time delay is the time period from the time point (Is), at which the injection start instruction signal is outputted, to the time point, at which fluctuation occurs in the detected pressure of the pressure sensor (20*a*), the fluctuation being attributed to the start of fuel injection. Therefore, in a condition where it is determined that a malfunction is caused, for example, an operation such as a control of an injection state can be performed adaptively to the malfunction, without using injection response delay information or the like. Therefore, robustness of the pressure sensor can be enhanced.

According to the above embodiments, the injection response delay information includes multiple information items, which is respectively obtained by conducting multiple examinations, the plurality of examinations respectively includes a plurality patterns of examination conditions, which are different from each other in pressure of fuel supplied to the fuel injection valve (20), and each of the information items is correlated to each of the plurality of patterns and stored. In the present structure, even in the case where the injection response delay information is changed in dependence upon the supply pressure of fuel to the fuel injection valve, the injection state can be controlled based on the injection response delay information according to the supply pressure. Therefore, the injection state can be controlled with high precision.

Here, in the present structure, the individual difference information obtained as a result of the examination in which the detected pressure and the fuel injection valve of the pressure sensor, which is mounted to the corresponding fuel injection device, are combined. Therefore, the detection characteristic of the pressure sensor actually used in an actual operation of the internal combustion engine can be reflected on the individual difference information. Therefore, the pressure sensor is mounted to the fuel injection valve. In the present structure, the pressure sensor, which is used in the injection characteristic examination before the factory shipment, can be restricted from being mounted to an injector, which is other than the corresponding injector. Thus, an erroneous assembly can be restricted.

Further, in the present structure, the location of the pressure sensor is closer to the injection hole, compared with the structure in which the pressure sensor is mounted to the high-pressure pipe, which connects the pressure-accumulating vessel with the injector. Therefore, pressure fluctuation at the injection holes can be further accurately detected, compared with a structure in which the pressure fluctuation, which has been attenuated through the high-pressure pipe, is detected.

The pressure sensor is mounted to the fuel injection valve. The pressure sensor (20*a*) may be located at a fuel inlet hole (22) of the fuel injection valve (20). Alternatively, the pressure sensor (20*a*) may be located in the fuel injection valve (20) for detecting pressure of fuel in an inner fuel passage (25), which extends from the fuel inlet hole (22) to the nozzle hole (20*f*).

Further in the case where the fuel inlet hole is mounted with the pressure sensor as described above, the mounting structure of the pressure sensor can be simplified, compared with the structure in which the inside of the fuel injection valve is mounted with the pressure sensor. On the other hand, in the structure in which the inside of the fuel injection valve is mounted with the pressure sensor, the location of the pressure, sensor is closer to the injection holes, compared with the structure in which the fuel inlet hole is mounted with the pressure sensor. Therefore, pressure fluctuation in the injection holes can be further properly detected.

According to the above embodiments, an orifice (12*a*) is provided in a fuel passage (25), which extends from the pressure-accumulation vessel (12) to a fuel inlet hole (22) for attenuating pulsation in pressure of fuel flowing from the pressure-accumulation vessel (12), and the pressure sensor (20*a*) is located downstream of the orifice (12*a*) with respect to fuel flow. In the case where the pressure sensor is located upstream of the orifice, fluctuation in pressure, which has been attenuated through the orifice, is detected. By contrast, according to the present structure, the pressure sensor is located downstream of the orifice. Therefore, pressure fluctuation can be detected before being attenuated through the orifice. Therefore, pressure fluctuation in the nozzle hole can be further properly detected.

According to the above embodiments, the storage unit is an integrated circuit memory (IC memory). Therefore, the storage unit can be preferably increased in storage capacity, compared with the QR code (registered trademark).

The inventors conceived that a malfunction caused in the fuel injection device, in which the pressure sensor is located closer to the nozzle hole than the pressure-accumulating vessel, can be easily determined by the following methods.

Specifically, one method includes measuring the injection response time delay (T1) by conducting an examination, the injection response time delay (T1) being the time period from the time point (R3), at which fuel injection through the nozzle hole (20*f*) starts, to the time point (P3), at which a fluctuation occurs in detected pressure of the pressure sensor (20*a*), the fluctuation being attributed to the start of fuel injection. The method further includes determining that the fuel injection device malfunctions when the injection response time delay (T1) is larger than the threshold.

When variation in location of the pressure sensor and the individual difference of the pressure sensor is out of an allowable range, the injection response time delay (T1) is larger than the threshold. Therefore, according to the present method, which includes the measuring and determining, a malfunction caused in the pressure sensor can be easily determined. The measuring and the determining may be conducted in a manufacturing factory before the shipment and a service factory for performing repair work and examination after the shipment.

Alternatively, another method includes first-measuring the reference instruction-detection time delay (T10*m*) by conducting an examination for the master fuel injection valve (20*m*) and the master sensor (20*am*). The method further includes second-measuring an object instruction-detection time delay (T10) by conducting an examination for the fuel injection valve (20) and pressure sensor (20*a*) as examined objects of the malfunction. Each of the reference instruction-detection time delay (T10*m*) and the object instruction-defection time delay (T10) is the time period from the time point (Is), at which the injection start instruction signal is outputted, to the time point (P3, P3*m*), at which a fluctuation occurs in detected pressure, the fluctuation being attributed to start of fuel injection. The master fuel injection valve (20*m*) and the master sensor (20*am*) are respectively different from the fuel injection valve (20) and pressure sensor (20*a*). The method further includes determining that at least one of the examined objects malfunctions when the error (ΔT10) of the object instruction-detection time delay (T10) with respect to the reference instruction-detection time delay (T10*m*) is larger than a threshold.

When variation in location of the pressure sensor and the individual difference of the pressure sensor is out of an allowable range, or when variation in the instruction-injection delay time (invalid period), which is attributed to the variation in individual difference of the fuel injection valve, is out of an allowable range, error (ΔT10) of the object instruction-detection time delay (T10) with respect to the reference instruction-detection time delay (T10*m*) is larger than the threshold. Therefore, according to the present method, which includes the measuring and determining, a malfunction caused in the pressure sensor or the fuel injection valve can be easily determined. The measuring and the determining may be conducted in a manufacturing factory before the shipment and a service factory for performing repair work and examination after the shipment.

The above structures of the embodiments can be combined as appropriate. The above processings such as calculations and determinations are not limited being executed by the ECU 30. The control unit may have various structures including the ECU 30 shown as an example.

The above processings such as calculations and determinations may be performed by any one or any combinations of software, an electric circuit, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A fuel injection device configured to be supplied with fuel from a pressure-accumulation vessel, the fuel injection device comprising:

a fuel injection valve for injecting fuel, which is distributed from the pressure-accumulation vessel;

a pressure sensor mounted on the fuel injection valve and configured to detect pressure of fuel; and an IC memory mounted on the fuel injection valve for storing individual difference information, which indicates an injection characteristic of the fuel injection valve, the injection characteristic being obtained by an examination using the pressure sensor and stored in the IC memory, wherein the individual difference information includes injection response delay information, which indicates at least one of an injection response time delay and a first parameter, the injection response time delay is a time period from an injection start point, at which fuel injection through a nozzle hole of the fuel injection valve starts, to a time point, at which a fluctuation occurs in detected pressure of the pressure sensor, the fluctuation being attributed to the start of fuel injection, the first parameter is required for calculating the injection response time delay, the examination is conducted in a condition where both the pressure sensor and the IC memory are mounted on the fuel injection valve, the pressure sensor and the IC memory, each used in the examination are, without being detached from the fuel injection valve, used in actual use in a condition where the fuel injection valve is mounted on an internal combustion engine, the injection start point is actually detected in the examination, the injection response delay information includes a plurality of information items, which is respectively obtained by conducting a plurality of examinations, the plurality of examinations respectively includes a plurality patterns of examination conditions, which are different from each other in pressure of fuel supplied to the fuel injection valve, and each of the information items is correlated to each of the plurality of patterns and stored, the fuel injection valve has a control chamber having an fuel inlet hole and a leak hole, the fuel inlet hole is configured to be supplied with fuel distributed from the pressure-accumulation vessel, the fuel injection valve includes a control valve configured to open and close the leak hole so as to return fuel to a fuel tank, the fuel injection valve includes a needle valve for opening and closing the nozzle hole, the control valve is configured to control pressure of fuel in the control chamber so as to manipulate the needle valve, the individual difference information includes leak response delay information, which indicates at least one of a leak response time delay and a second parameter, the leak response time delay is a time period from a time point, at which fuel leak through the leak hole starts, to a time point, at which a fluctuation occurs in detected pressure of the pressure sensor, the fluctuation being attributed to the start of fuel leak, and the second parameter is required for calculating the leak response time delay.

2. The fuel injection device according to claim 1, wherein at least one of the second parameter is a passage length from the leak hole to the pressure sensor.

3. The fuel injection device according to claim 1, wherein the at least one of the first parameter or the at least one of the second parameter is a bulk modulus of fuel in the entire of a passage, the passage extending from an outlet port of a high-pressure pump to the nozzle hole, and the high-pressure pump is configured to supply fuel to the pressure-accumulation vessel.

4. A fuel injection device comprising:

a fuel injection valve for injecting fuel supplied from a pressure-accumulation vessel;

a pressure sensor mounted on the fuel injection valve for detecting pressure of fuel;

an IC memory mounted on the fuel injection valve for storing individual difference information; and a control unit configured to receive the individual difference information transmitted from the IC memory to obtain an injection pattern in actual use of the fuel injection device, the control unit further configured to cause the fuel injection device to inject fuel into the combustion chamber of the engine in accordance with the injection pattern in the actual use where the fuel injection device is mounted to an internal combustion engine and caused to inject fuel into a combustion chamber of the internal combustion engine, wherein the individual difference information indicates an injection characteristic of the fuel injection valve, the injection characteristic being obtained in an examination using the pressure sensor and stored in the IC memory in a condition where both the pressure sensor and the IC memory are mounted on the fuel injection valve, the examination being conducted in advance of actual use, and the individual difference information includes information related to an injection response time delay between an injection start point, at which fuel injection through a nozzle hole of the fuel injection valve starts, and a time point, at which a fluctuation occurs in detected pressure of the pressure sensor due to the start of fuel injection, the pressure sensor and the IC memory, each used in the examination are, without being detached from the fuel injection valve, used in actual use in a condition where the fuel injection valve is mounted on the internal combustion engine, the injection start point is actually detected in the examination, information relating to the injection response time delay includes a plurality of information items, which is respectively obtained by conducting a plurality of examinations, the plurality of examinations respectively includes a plurality patterns of examination conditions, which are different from each other in pressure of fuel supplied to the fuel injection valve, each of the information items is correlated to each of the plurality of patterns and stored, the fuel injection valve has a control chamber having an fuel inlet hole and a leak hole, the fuel inlet hole is configured to be supplied with fuel distributed from the pressure-accumulation vessel, the fuel injection valve includes a control valve configured to open and close the leak hole so as to return fuel to a fuel tank, the fuel injection valve includes a needle valve for opening and closing the nozzle hole, the control valve is configured to control pressure of fuel in the control chamber so as to manipulate the needle valve, the individual difference information includes leak response delay information, which indicates at least one of a leak response time delay and a parameter, the leak response time delay is a time period from a time point, at which fuel leak through the leak hole starts, to a time point, at which a fluctuation occurs in detected pressure of the pressure sensor, the fluctuation being attributed to the start of fuel leak, and the parameter is required for calculating the leak response time delay.

* * * * *